United States Patent
Mather et al.

(10) Patent No.: US 11,695,593 B2
(45) Date of Patent: Jul. 4, 2023

(54) SYSTEMS AND METHODS FOR HIGH CAPACITY POWER DELIVERY TO REMOTE NODES

(71) Applicant: CommScope Technologies LLC, Hickory, NC (US)

(72) Inventors: David James Mather, Cheshire (GB); Ian Miles Standish, North Wales (GB); Jan Jozef Julia Maria Erreygers, Tielt-Winge (BE)

(73) Assignee: CommScope Technologies LLC, Hickory, NC (US)

( * ) Notice: Subject to any disclaimer, the term of this patent is extended or adjusted under 35 U.S.C. 154(b) by 240 days.

(21) Appl. No.: 17/102,589

(22) Filed: Nov. 24, 2020

(65) Prior Publication Data
US 2021/0083904 A1    Mar. 18, 2021

Related U.S. Application Data

(63) Continuation of application No. 16/318,624, filed as application No. PCT/US2017/042536 on Jul. 18, 2017, now Pat. No. 10,880,125.
(Continued)

(51) Int. Cl.
*H04L 12/64* (2006.01)
*H04L 12/10* (2006.01)
(Continued)

(52) U.S. Cl.
CPC .............. *H04L 12/64* (2013.01); *H04L 12/10* (2013.01); *H04L 12/40045* (2013.01);
(Continued)

(58) Field of Classification Search
CPC ... H04L 12/64; H04L 12/10; H04L 12/40045; H04L 41/12; H04L 43/10; Y04S 40/00
See application file for complete search history.

(56) References Cited

U.S. PATENT DOCUMENTS

| 7,454,012 B2 | 11/2008 | Nattkemper et al. |
| 7,599,484 B2 | 10/2009 | Nattkemper |

(Continued)

FOREIGN PATENT DOCUMENTS

| EP | 1942600 A1 | 7/2008 |
| EP | 2950480 A1 | 12/2015 |

(Continued)

OTHER PUBLICATIONS

European Patent Office, "Communication pursuant to Article 94(3) EPC from EP Application No. 17831672.5", from Foreign Counterpart to U.S. Appl. No. 16/318,624, dated Jun. 24, 2021, pp. 1 through 6, Published: EP.

(Continued)

*Primary Examiner* — Christopher M Crutchfield
*Assistant Examiner* — Tito Q Pham
(74) *Attorney, Agent, or Firm* — Fogg & Powers LLC

(57) ABSTRACT

Embodiments include a power distribution access network comprising power sourcing equipment (PSE) having a hybrid power-data port and at least one remote distribution node coupled to the PSE. The PSE delivers power at a first voltage to the distribution node and the distribution node delivers power at a second voltage to a remote device. Delivery of power to the distribution nodes may be based on information from the distribution node. Other embodiments include a power distribution access network with remote distribution nodes daisy-chained together by hybrid power-data cables so that a power line and a plurality of optical lines pass along the distribution nodes. The optical lines sequentially drop off along the chain and a remainder of the optical lines is indexed at each distribution node. Remote powered devices are coupled to the distribution nodes. Each remote powered device receives power and optical signals from the respective remote distribution node.

19 Claims, 21 Drawing Sheets

Related U.S. Application Data

(60) Provisional application No. 62/363,737, filed on Jul. 18, 2016, provisional application No. 62/363,724, filed on Jul. 18, 2016.

(51) Int. Cl.
  *H04L 12/40* (2006.01)
  *H04L 43/10* (2022.01)
  *H04L 41/12* (2022.01)

(52) U.S. Cl.
  CPC .............. *H04L 41/12* (2013.01); *H04L 43/10* (2013.01); *Y04S 40/00* (2013.01)

(56) References Cited

U.S. PATENT DOCUMENTS

| | | | |
|---|---|---|---|
| 8,793,511 B1 * | 7/2014 | Bishara | H04L 12/10 713/320 |
| 9,207,735 B2 * | 12/2015 | Khaitan | G06F 1/263 |
| 9,703,650 B1 | 7/2017 | Byers et al. | |
| 2003/0146765 A1 * | 8/2003 | Darshan | H04L 49/351 324/539 |
| 2004/0017911 A1 | 1/2004 | Nattkemper | |
| 2004/0032947 A1 * | 2/2004 | Nattkemper | H04M 19/001 379/413 |
| 2006/0053324 A1 * | 3/2006 | Giat | H04L 12/10 713/300 |
| 2006/0080573 A1 | 4/2006 | Biederman et al. | |
| 2006/0215680 A1 | 9/2006 | Camagna | |
| 2006/0273661 A1 | 12/2006 | Toebes et al. | |
| 2007/0021094 A1 * | 1/2007 | Elkayam | H04L 12/10 455/402 |
| 2009/0257580 A1 | 10/2009 | Nattkemper et al. | |
| 2011/0241425 A1 | 10/2011 | Hunter, Jr. et al. | |
| 2012/0317426 A1 | 12/2012 | Hunter, Jr. et al. | |
| 2014/0050228 A1 | 2/2014 | Binder | |
| 2014/0087742 A1 | 3/2014 | Brower et al. | |
| 2014/0258742 A1 * | 9/2014 | Chien | H04L 12/10 713/300 |
| 2014/0265550 A1 | 9/2014 | Milligan et al. | |
| 2014/0293994 A1 | 10/2014 | Pepe et al. | |
| 2015/0042162 A1 | 2/2015 | Cooper et al. | |
| 2016/0020858 A1 * | 1/2016 | Sipes, Jr. | H04B 10/272 398/116 |
| 2016/0033730 A1 | 2/2016 | Vastmans et al. | |
| 2016/0064938 A1 * | 3/2016 | Balasubramanian | H04L 12/10 307/11 |
| 2016/0080159 A1 * | 3/2016 | Hunter, Jr. | H04L 12/10 375/257 |
| 2016/0197735 A1 * | 7/2016 | Ferentz | H04L 12/10 307/1 |
| 2016/0273722 A1 * | 9/2016 | Crenshaw | H02J 9/065 |
| 2017/0310491 A1 * | 10/2017 | Dwelley | H04L 12/10 |
| 2017/0351309 A1 * | 12/2017 | Hartnett | H04L 12/10 |
| 2019/0229934 A1 * | 7/2019 | Zhuang | G06F 1/266 |
| 2019/0280895 A1 | 9/2019 | Mather et al. | |

FOREIGN PATENT DOCUMENTS

| | | | |
|---|---|---|---|
| EP | 3236615 | A1 | 10/2017 |
| WO | 0041496 | A2 | 7/2000 |
| WO | 0158123 | A1 | 8/2001 |
| WO | 2014197103 | A2 | 12/2014 |
| WO | 2014197103 | A3 | 1/2015 |
| WO | 2015009713 | A1 | 1/2015 |
| WO | 2016059435 | A1 | 4/2016 |

OTHER PUBLICATIONS

"Powered Fiber Cable System Technical Overview"; CommScope; pp. 1-8; Published: US; 2016.
Aruba Networks; "Aruba System Partnership"; pp. 1-6; CommScope; Published: US.
Aruba Networks; "Powered Fiber Cable System"; TE Connectivity; pp. 1-6; 2015.
Berk-Tek; "Extending the Reach of PoE Powered Devices"; pp. 1-8; Berk-Tek A Nexans Company; Published: US.
Blazen Illuminations; Martin VC-Grid 25: Modular LED Video; pp. 1-2; http://blazenlights.com/index.php?option=com_content&view-article&id=288&Itemid=253; Retrieved Jun. 15, 2016; Published: US.
Corning: "illuminating wireless"; Corning MobileAccess, Inc.; 2013; pp. 1-4; Published: US.
Corning; "POL & the Wireless of Things: Connectivity Considerations"; pp. 1-22.
Eisen, Morty; "Introduction to PoE and the IEEE802.3af and 802.3at Standards"; Marcum Technology; Oct. 29, 2009; pp. 1-42.
European Patent Office, "Communication pursuant to Article 94(3) EPC from EP Application No. 17831672.5", from Foreign Counterpart to U.S. Appl. No. 16/318,624, dated Oct. 22, 2020, pp. 1 through 7, Published: EP.
European Patent Office, "Extended European Search Report from EP Application No. 17831672.5", from Foreign Counterpart to U.S. Appl. No. 16/318,624, dated Nov. 5, 2019, pp. 1-8, Published: EP.
International Searching Authority; "Notification of Transmittal of The International Search Report and The Written Opinion of The International Searching Authority, from PCT Application No. PCT/US2017/042536, dated Nov. 7, 2017"; from foreign Counterpart of U.S. Appl. No. 62/363,737; pp. 1-22; Published: KR.
Jones, Jason; "Fiber Optics in High Voltage Transmission Environments"; pp. 1-15; Oct. 8, 2003.
Kurk, Morgan; "Do Operators Havbe Enough "Power" in 2016?"; CommScope; Jan. 18, 2016; pp. 1-5; Published: US.
Martin by Harman; "P3 PowerPort 1500 User Manual"; pp. 1-20; Martin Professional A/S; 2012.
Martin by Harman; "P3 PowerPort 1500"; pp. 1-3; 2015 Martin Professional.
Neveux, Paul; "Extending Power-Over-Ethemet With Optical Fiber"; ISE IC Solutaions & Education; Jun. 4, 2016; pp. 1-4; Published: US.
Nexans; "CL3R-OF Composite Fiber Cable—Description"; Berk-Tek; pp. 1-4; http://www.nexans.us/eservice/US-en_US/navigate_251152/CL3R_OF_Composite_Fiber_Cable.html#description; Retrieved Jun. 15, 2016; Published: US.
Nexans; "CL3R-OF Composite Fiber Cable—Products and Services"; Berk-Tek; pp. 1-2; http://www.nexans.us/eservice/US-en_US/navigate_251152/CL3R_OF_Composite_Fiber_Cable.html; Retrieved Jun. 15, 2016; Published: US.
Shure Technical FAQ; "What is PoE?"; Sep. 4, 2013; pp. 1-2; http:shure.custhelp.com/app/answers/detail/a_id/5433/_/what-is-poe%3F.
TP-LINK; "How to use the Passive POE Passthrough function on the Pharos-Series products?"; pp. 1-3; http://www.tp-link.us/faq.695.html; 2016; Published: US.
U.S. Patent and Trademark Office, "Notice of Allowance", U.S. Appl. No. 16/318,624, filed Oct. 1, 2020, pp. 1 through 9, Published: US.
U.S. Patent and Trademark Office, "Office Action", U.S. Appl. No. 16/318,624, filed Sep. 3, 2020, pp. 1 through 27, Published: US.
U.S. Patent and Trademark Office, "Restriction Requirement", U.S. Appl. No. 16/318,624, filed May 18, 2020, pp. 1 through 7, Published: US.
U.S. Patent and Trademark Office, "Supplemental Notice of Allowability", U.S. Appl. No. 16/318,624, filed Nov. 12, 2020, pp. 1 through 9, Published: US.

* cited by examiner

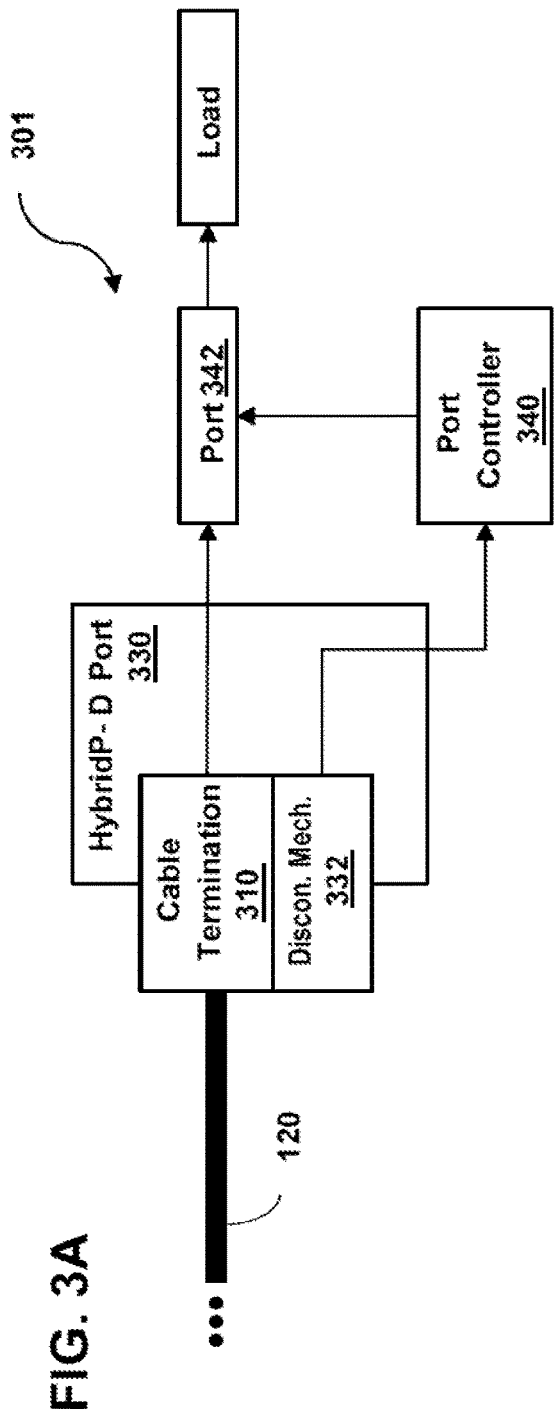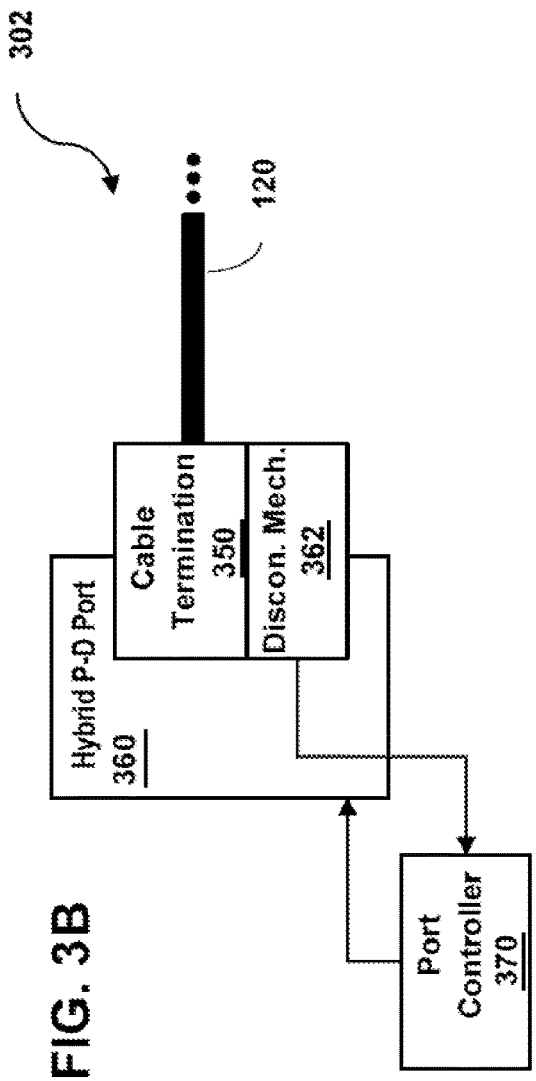
FIG. 3A
FIG. 3B

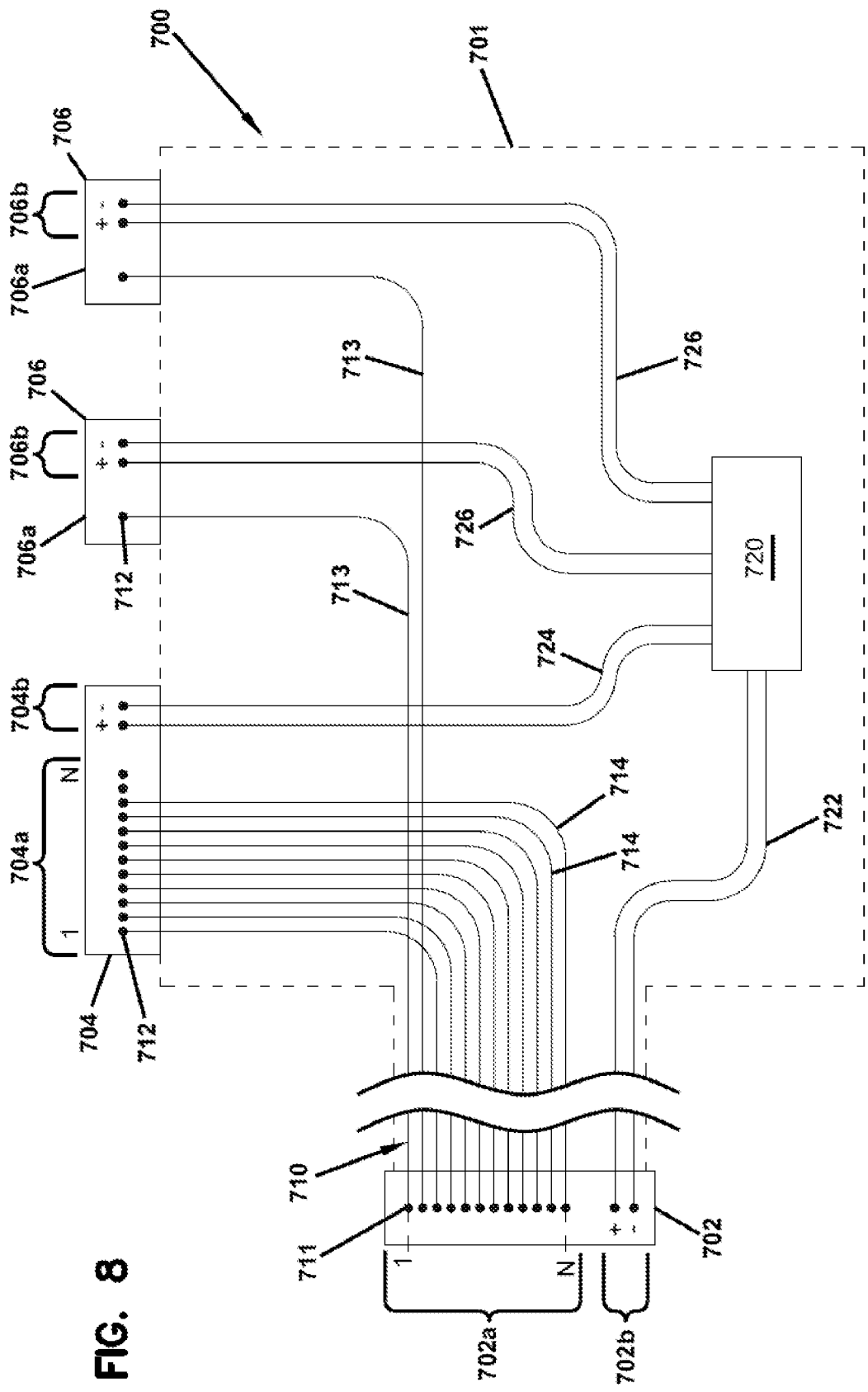

SYSTEMS AND METHODS FOR HIGH CAPACITY POWER DELIVERY TO REMOTE NODES

CROSS-REFERENCE TO RELATED APPLICATIONS

This Application is a Continuation Application of U.S. patent application Ser. No. 16/318,624, titled "SYSTEMS AND METHODS FOR HIGH CAPACITY POWER DELIVERY TO REMOTE NODES", filed on Jan. 17, 2019, which is a National Stage 371 Application of International Patent Application No. PCT/US2017/042536 titled "SYSTEMS AND METHODS FOR HIGH CAPACITY POWER DELIVERY TO REMOTE NODES" filed on Jul. 18, 2017, which claims priority to, and the benefit of, U.S. Provisional Patent Application No. 62/363,737, titled "SYSTEMS AND METHODS FOR HIGH CAPACITY POWER DELIVERY TO REMOTE NODES" and filed on Jul. 18, 2016, and U.S. Provisional Patent Application No. 62/363,724, titled "SYSTEMS AND METHODS FOR HIGH CAPACITY POWER DELIVERY TO REMOTE NODES" filed on Jul. 18, 2016, each of which are incorporated by reference herein in their entirety.

BACKGROUND

In many networked locations, a network connected device needs to be located at a physical location where a local power source is not available to provide electrical power to the device. Network devices are currently under development that utilize a hybrid power and data cables to provide both data and power services to a device. These devices rely on existing standard compliant data cables which have a distance limit of 100 meters and a power deliver capacity limited to 100 watts. However, there is an increasing need to deliver electrical power exceeding 100 watts to distances exceeding 100 meters sharing the same cable used to provide data connectivity to the device.

SUMMARY

The embodiments of the present disclosure provide methods and systems for providing data connectivity with high capacity power delivery to remote nodes and will be understood by reading and studying the following specification.

In some aspects of the disclosure, a power distributing access network comprises: a power sourcing equipment device having at least one hybrid power-data port; at least one remote distribution node coupled to the power sourcing equipment device by a hybrid power-data cable; at least one remote powered device coupled to the at least one remote distribution node; and a power management system coupled to the power sourcing equipment device; wherein the at least one hybrid power-data port is configured to deliver power at a first voltage level to the at least one remote distribution node over at least one pair of electrical conductors of the hybrid power-data cable; wherein the at least one remote distribution node is configured to deliver power, at a second voltage level different than the first voltage level, to the at least one remote powered device; and wherein the power management system enables delivery of power at the first voltage level to the at least one remote distribution node based on power class information received from the at least one remote distribution node via the power sourcing equipment device.

Some aspects of the disclosure are directed to a power distribution access network including a power sourcing equipment device having at least one hybrid power-data port; and a plurality of remote distribution nodes daisy-chained together by a plurality of hybrid power-data cables so that a power line and a plurality of optical lines pass along the remote distribution nodes. The optical lines sequentially drop off along the chain. Remaining optical lines are indexed at each remote distribution node. A first of the remote distribution nodes is coupled to the power sourcing equipment device.

In certain implementations, at least one remote powered device is coupled to the at least one of the remote distribution nodes by a hybrid cable. The at least one remote powered device receives power and optical signals from the at least one of the remote distribution nodes.

In certain implementations, a last of the remote distribution nodes in the daisy-chain is coupled to the power sourcing equipment device.

In certain implementations, each remote distribution node includes a first local connection interface and a second local connection interface. The first local connection interface receives optical signals carried in a first indexing direction from the first remote distribution node. The second local connection interface receives optical signals carried in a second indexing direction from the last remote distribution node.

In some examples, a remote powered device is coupled to the at least one of the remote distribution nodes by a coupler arrangement. The coupler arrangement optically and electrically couples the remote powered device to both the first and second local connection interfaces.

In other examples, a plurality of remote powered devices, each remote powered device being optically and electrically coupled to a respective one of the local connection interfaces.

In certain implementations, at least one of remote distribution nodes includes a first part and an optional second part. The optical lines drop off at the first part and are indexed at the first part. The second part has power management circuitry. In certain examples, the second part holds a voltage converter.

Other aspects of the disclosure are directed to a remote distribution node including a housing; a first hybrid power-data connection interface coupled to the housing, a second hybrid power-data connection interface coupled to the housing, and a local hybrid power-data connection interface coupled to the housing. Each of the first and second hybrid power-data connection interfaces includes a fiber interface and a power interface. Each fiber interface of the first and second hybrid power-data connection interfaces has a plurality of sequential fiber positions. The local hybrid power-data connection interface including a fiber interface and a power interface. The fiber interface of the local hybrid power-data connection interface has fewer optical fibers than the fiber interface of the first and second hybrid power-data connection interfaces. The power interface of the first hybrid power-data connection interface is electrically connected to the power interface of the second hybrid power-data connection interface and to the power interface of the local hybrid power-data connection interface. Multiple optical fibers have first ends disposed at the sequential fiber positions of the fiber interface of the first hybrid power-data connection interface. The optical fibers include a first optical fiber extending to the fiber interface of the local hybrid power-data connection interface. The remaining optical fibers extend to the fiber interface of the second hybrid power-data connection interface. The remaining optical fibers are indexed along the sequential fiber positions between the fiber interface of the first hybrid power-data connection interface and the fiber interface of the second hybrid power-data connection interface.

In some examples, the first hybrid power-data connection interface includes a hybrid port held by the housing. In other examples, the first hybrid power-data connection interface includes a plug connector held by the housing. In still other examples, the first hybrid power-data connection interface includes a plug connector terminating a stub hybrid cable extending out from the housing. The plug connector is disposed external of the housing.

In certain implementations, a power management arrangement is disposed within the housing. The power management arrangement electrically connects the power interface of the first hybrid power-data connection interface to the power interface of the second hybrid power-data connection interface and to the power interface of the local hybrid power-data connection interface.

In certain examples, the power management arrangement manages a voltage of the power passing between the hybrid power-data connection interfaces so that power at a first voltage level is delivered to the local hybrid power-data connection interface and power at a second voltage level is delivered to the second hybrid power-data connection interface. In an example, the first voltage level is less than the second voltage level.

In certain examples, the power management arrangement includes a node controller and a power converter (e.g., a DC-to-DC converter).

In certain implementations, the fiber interface of the local hybrid power-data connection interface includes only a single optical fiber position.

Other aspects of the disclosure are directed to a network interface device including a housing defining an interior; a first hybrid power-data connection interface carried by the housing, a second hybrid power-data connection interface carried by the housing, and a local port including a local fiber interface and a local power interface. The first hybrid power-data connection interface includes a first fiber interface and a first power interface. The first fiber interface defines sequential fiber positions. The second hybrid power-data connection interface includes a second fiber interface and a second power interface. The second fiber interface defines sequential fiber positions. The second fiber interface has a common number of sequential fiber positions with the first fiber interface. The local port is configured to deliver electric power and a data connectivity to a remote powered device coupled to the local port.

Optical fibers have first ends disposed at the sequential fiber positions of the first fiber interface of the first hybrid power-data connection interface. The optical fibers include a first optical fiber having an opposite second end disposed at the fiber interface of the local hybrid power-data connection interface. Remaining optical fibers have second ends routed to the second fiber interface of the second hybrid power-data connection interface. The remaining optical fibers are indexed between the first fiber interface and the second fiber interface.

The network interface device also includes a gated pass-through power bus coupled between the first hybrid power-data connection interface and a second hybrid power-data connection interface; and a local power bus coupled to at least the local port. The local power bus operates at a different voltage than the gated pass-through power bus.

A node controller is powered from at least one of the first hybrid power-data connection interface and the second hybrid power-data connection interface. Power flow through the gated pass-through power bus is controlled by the node controller.

In certain implementations, the network interface device also includes a DC-to-DC converter. Power flow from the pass-through power bus to the local power bus is controlled by the DC-to-DC converter.

In certain implementations, the first hybrid power-data connection interface includes a hybrid adapter port. In certain examples, the hybrid adapter port is disposed at a wall of the housing.

In certain implementations, the first hybrid power-data connection interface includes a hybrid plug connector. In certain examples, the optical fibers extend from an interior of the housing to the hybrid plug connector external of and spaced from the housing. In certain examples, the hybrid plug connector is a ruggedized plug connector including a twist-to-lock fastener and including part of an environmental sealing mechanism. In an example, the part of the environmental sealing mechanism includes a gasket.

In certain implementations, the second hybrid power-data connection interface includes a hybrid adapter port. In certain examples, the hybrid adapter port is disposed at a wall of the housing.

In certain implementations, the second hybrid power-data connection interface includes a hybrid plug connector. In certain examples, the first and second optical fibers extend from an interior of the housing to the hybrid plug connector external of and spaced from the housing. In an example, the hybrid plug connector is a ruggedized plug connector including a twist-to-lock fastener and including part of an environmental sealing mechanism. In an example, the part of the environmental sealing mechanism includes a gasket.

In certain implementations, the local port is a first of a plurality of local ports. In certain examples, the first optical fiber is one of a plurality of dropped fibers. Each dropped fiber extends between one of the local ports and one of the sequential fiber positions at the first fiber interface of the first hybrid power-data connection interface.

In certain implementations, a bi-directional indexing optical fiber extends between a second of the local ports and a non-first sequential fiber position at the first fiber interface of the second hybrid power-data connection interface. In certain examples, the non-first sequential fiber position is a last sequential fiber position at the first fiber interface of the second hybrid power-data connection interface.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DRAWINGS

Embodiments of the present disclosure can be more easily understood and further advantages and uses thereof more readily apparent, when considered in view of the description of the preferred embodiments and the following figures in which:

FIGS. 3A and 3B are diagrams illustrating a port disconnect trigger mechanism of one embodiment of the present disclosure.

FIG. 8 is a schematic diagram of an example intelligent remote distribution node suitable for use in the power distributing fiber access network of FIG. 1.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
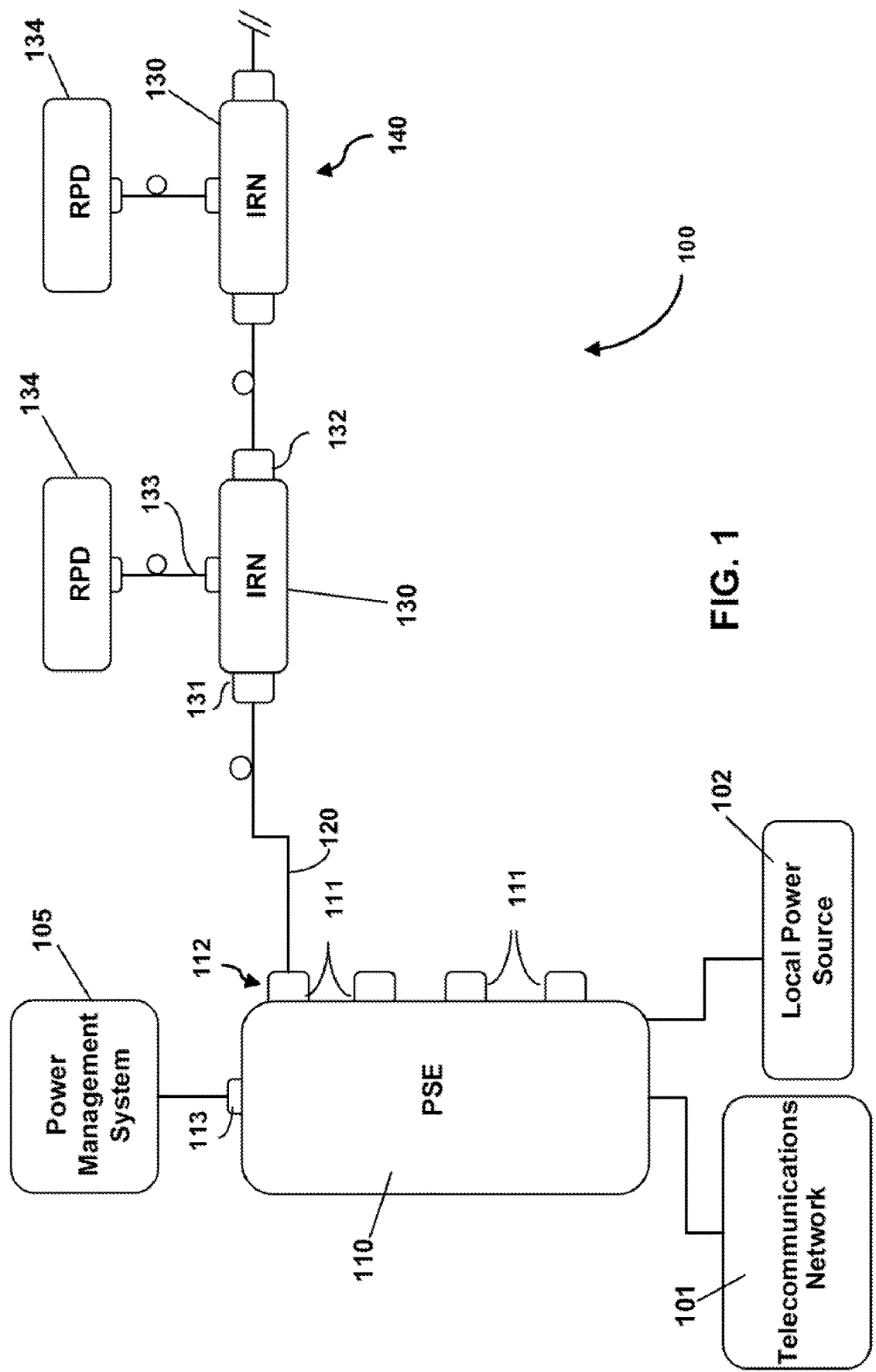
FIG. 1 is a diagram illustrating a power distributing fiber access network of one embodiment of the present disclosure.

FIG. 1 is a diagram illustrating a point-to-multipoint power distributing fiber access network 100 of one embodiment of the present disclosure. Network 100 comprises a head end power sourcing equipment (PSE) device 110 communicatively coupled to a telecommunications network 101 and further coupled to a local electrical power source 102 (such as electric utility powered electrical bus). Network 100 further comprises one or more intelligent remote distribution nodes 130 coupled to the PSE 110 via a hybrid power-data cable 120. Intelligent remote distribution nodes 130, in turn, are coupled to one or more remote powered devices 134.

In some embodiments, telecommunications network 101 is a telecommunications network, for example, providing voice, data and video services to customer premise equipment (CPE) such as the remote powered devices 134. In some embodiments, the remote powered devices 134 are CPE and the intelligent remote distribution nodes 130 provide network interface devices that define the demarcation point separating the CPE from a telecommunications service provider network. In other embodiments, the intelligent remote distribution nodes 130 may be upstream from the demarcation point, but located at the customer premise. It should be understood that although this disclosure primarily focuses on networks where power and data connectivity are distributed from a PSE to one or more remote powered devices via intelligent remote distribution nodes, some embodiments or parts thereof may provide for power delivery without data connectivity. Such power only embodiments may deliver power as described herein, but omit or otherwise not utilize elements discussed below associated strictly with data connectivity.

As shown in FIG. 1, an intelligent remote distribution node 130 may be directly coupled to a hybrid power-data port 111 of the PSE 110. Alternatively, an intelligent remote distribution node 130 may be indirectly coupled a hybrid power-data port 111 of the PSE 110 in a daisy-chain manner through one or more intervening devices. Such intervening devices may be another intelligent remote distribution node 130. In other embodiments, the intervening device may another device, such as a passive coupling device, for example, positioned between PSE 110 and the intelligent remote distribution node 130. The term "hybrid power-data port" may also be referred to herein as a "hybrid power-data connection interface."

In some embodiments in operation, in a point-to-multipoint configuration PSE 110 distributes both electrical DC power and data connectivity to the remote powered devices 134 through the intelligent remote distribution nodes 130. More specifically, PSE 110 utilizes proprietary hybrid power-data cables 120 to deliver high power DC electricity to the intelligent remote distribution nodes 130. Each remote distribution node 130 may then deliver power to one or more remote powered devices 134. For example, in one embodiment, PSE 110 is a device conforming to the International Electrotechnical Commission (IEC) 62368 series of hazard-based safety standards which define classes of electrical energy sources including: a class 1 electrical energy source (referred to herein and by the standard as "ES1"), a class 2 electrical energy source which may provide voltage and current exceeding the limits for ES1 (referred to herein and by the standard as "ES2"), and a class 3 electrical energy source which may provide voltage and current exceeding the limits for ES2 (referred to herein and by the standard as "ES3"). For example, an ES1 power source may deliver power at its ports at a voltage up to +/−60 Vdc, while an ES2 power source may deliver power at its powers at a voltage up to +/−120 Vdc. IEC 62368 also defines classes of electrical power sources including: an electrical power source class 1 circuit (referred to herein and by the standard as "PS1") where the power available from a port on the power source does not exceed 15 Watts, an electrical power source class 2 circuit (referred to herein and by the standard as "PS2") where the power available from a port on the power source does not exceed 100 Watts, and an electrical power source class 3 circuit (referred to herein and by the standard as "PS3") where the power available from a port on the power source does exceed 100 Watts. In some implementations, one or more ports 111 of PSE 110 are classified as PS3 electrical power sources. As such, with some embodiments, each intelligent remote distribution node 130 receives a relatively high-voltage signal (such as an ES2 voltage signal, for example) and drops the voltage down to a relatively low-voltage electrical signal (such as an ES1 voltage signal, for example) which can be distributed to the remote powered devices 134. At ES1, power from the intelligent remote distribution node 130 to one or more remote powered devices 134 may be delivered over standard data cables and using known standards based protocols such as Power-over-Ethernet (PoE), PoE+, and other standards known to those of skill in the art. It should be appreciated that reference to IEC 62368 and its associated electrical and power classes is made for illustrative purposes only and other embodiments may be implemented using other voltage, current and power levels based on other industry standard or proprietary specifications. In general, intelligent remote distribution nodes 130 step-down the voltage level of the electric power they receive from the PSE 110 to a voltage level that may be standards compliant for delivery via standard data cables to one or more remote powered devices 134. In alternate implementations, the intelligent remote distribution nodes 130 may deliver power to remote powered devices 134 such as, but not limited to lighting, security cameras, sensors or network access points. It should be understood that the remote powered devices 134 are not limited to in-building applications, but may be located throughout an outside plant or facility to enable delivery of power from a central location to remote satellite locations such as for powering radio equipment, small cellular communication cites or subsystems, security sensors, cameras, LED lighting.

The power available at a hybrid power-data port 111 is delivered to the one or more intelligent remote distribution nodes 130 via one or more hybrid power-data cables 120 as further detailed below. In one embodiment, the PSE 110 converts AC or DC electric power it receives from the local electrical power source 102 into a DC voltage for delivery to the intelligent remote distribution nodes 130. In one embodiment PSE 110 comprises one or more transformers, converters, and/or power conditioners to convert AC or DC supplied power received from local power supply 102 to the DC power provided at ports 111.

Each intelligent remote distribution node 130 is coupled either directly or indirectly to at least one port 111 of PSE 110 by a hybrid power-data cable 120. In any of the embodiments described herein, data connectivity in network 100 may be delivered optically over fiber optics, electrically over electrical conductors, or some combination of both. Accordingly, where data connectivity is provided by electrical signals, the hybrid power-data cable 120 may comprise at least one pair of electrical conductors (for example 12 AWG or 16 AWG copper conductors) to deliver power, and a plurality of electrical conductors over which data is communicated. Alternately, the hybrid power-data cable 120 may comprise at least one pair of electrical conductors that together carry power and communicate data over the same conductors. Such a hybrid power-data cable 120 may comprise, for example, a twisted-pair of conductors, or a co-axial cable. Such a configuration may utilize powerline communications where data is communicated at a higher frequency band segregated from power delivery. Where data connectivity is provided by optical signals, the hybrid power-data cable 120 may comprises at least one pair of electrical conductors (for example 12 AWG or 16 AWG copper conductors) and a plurality of optical fibres. Further, where the connection between PSE 110 and the intelligent remote distribution nodes 130 establishes a high power circuit (for example a PS3 circuit which exceeds the PS2 100 watt limit), each end of hybrid power-data cable 120 is terminated by a proprietary connector that is rated to provide electric power at the elevated wattage and is compatible to couple with the hybrid power-data ports 111 of PSE 110 and the hybrid power-data ports 131 and 132 of the intelligent remote distribution nodes 130.

At each active hybrid-power data port 111, PSE 110 may selectively inject DC power onto the electrical conductor pairs of the hybrid power-data cable 120 coupled to the port 111. Data connectivity with telecommunications network 101 is established by switching data traffic to and from one or more of the plurality of optical fibres of the cable 120. In one embodiment, PSE 110 may be coupled to a power management system 105 that monitors and manages power delivery to the remote power devices 134 by switching the enablement of internal and external ports of PSE 110 and the intelligent remote distribution nodes 130. In one embodiment, power management system 105 may be coupled to PSE 110 via a separate management interface 113 as shown in FIG. 1. In other embodiments, power management system 105 may be coupled to PSE 110 via telecommunications network 101.

Figure 2:
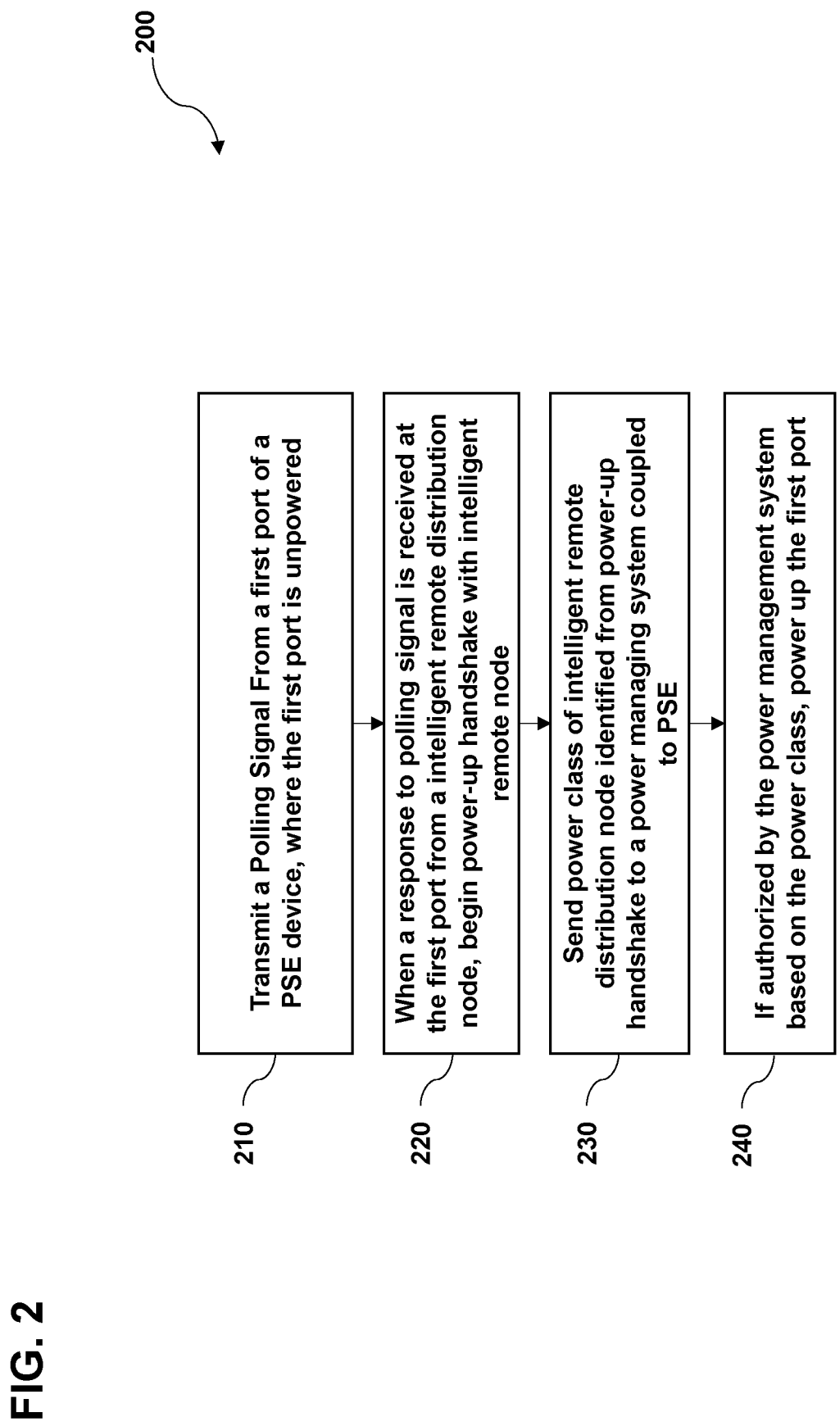
FIG. 2 is a flow chart illustrating a method of one embodiment of the present disclosure.

In some embodiments, a high voltage signal will only appear at a hybrid power-data ports after communications between that port and a connected intelligent remote distribution nodes 130 is established thought a power-up or handshake sequence. FIG. 2 is a flow chart illustrating a method 200 for one embodiment of such a power-up sequence. In alternate implementations, method 200 may be performed to power up a hybrid power-data port 111 on PSE 110 (or a managed gated pass-through hybrid power-data port 132 of an intelligent remote distribution node 130, which is described in greater detail below). Starting with a first hybrid power-data port that is currently un-powered, the port will periodically transmit a polling signal (block 210). The polling signal may be generated by a port controller for the first port, or may originate at the PSE 110 and be passed through to the first port.

Until a connection from the first port to a verified intelligent remote distribution node 130 is authorized, that port will remain unpowered. The polling signal may be generated to have specific characteristics that will make it recognizable as a polling signal to the intelligent remote distribution node 130 that receives it. For example, in one embodiment, the polling signal may be a low frequency AC signal (2 kHz-3 kHz for example) injected onto electrical conductors of the cable 120. In other embodiments, other signaling may be utilized such as but not limited to on-off keying, amplitude modulation, phase-shift keying (psk), frequency-shift keying (fsk), dual-tone multi-frequency signals, or other means. Reception at the first port of a reply signal back from cable 120 indicates that connectivity with an intelligent remote distribution node has been established, and a power-up handshake with that intelligent remote distribution node can continue (block 220). In one embodiment, the intelligent remote distribution node 130 obtains the power needed to transmit a response back to polling signal by harvesting power from the polling signal. In some embodiments, the intelligent remote distribution node 130 may be sent a low voltage AC or DC signal to provide it with the power needed to transmit a response back to polling signal. In one embodiment, the PSE 110 may sense a voltage level or other characteristic of the returned signaling and verify the characteristic is as expected before further proceeding. In one embodiment, in response to the polling signal, the intelligent remote distribution node 130 transmits a signal indicating its power class and this information is relayed to the power management system 105 (block 230). The power management system 105 may then determine (based on the indicated power class) if the PSE 110 has an adequate remaining power capacity margin for that hybrid data-power port to service the newly added intelligent remote distribution node 130. If there is an adequate power capacity margin, then the device is authorized and the power management system 105 instructs the PSE 110 to power-up the hybrid data-power port to service the newly added intelligent remote distribution node 130 (block 240). If not, the port remains de-energized. It should be understood that the power-up sequence process 200 may be utilized as the power-up sequence for any hybrid power-data port 111, or alternatively utilized for activating a managed gated pass-through hybrid power-data port at the intelligent remote distribution node 130 (such as hybrid power-data port 132) when a subsequent intelligent remote distribution node 130 is connected in a daisy-chain fashion to the first intelligent remote distribution node 130 (such as illustrated at 140 in FIG. 1).

In one embodiment, as illustrated in FIGS. 3A and 3B, the hybrid power-data ports in network 100 also each incorporate a port disconnect mechanism. This port disconnect mechanism is utilized to disable the current and/or voltage at a hybrid power-data port before a hybrid power-data cable connected to that port is physically decoupled. Shutting off the current and/or voltage prior to physical decoupling of the cable reduces the risk of electrical arcing and reduces the risk of a technician coming in contact with ES2 voltage levels. In other words, the port disconnect trigger mechanism forces the PSE 110 or intelligent remote distribution node 130 to drop the power flow before physical removal of the plug occurs. In one embodiment, a screw lock or other disconnect mechanism may initiate a trigger signal before a mechanical interlock releases to allow cable removal. The disconnect mechanism forces the trigger signal to occur first to provide adequate time for voltage de-energization before the mechanical interlock releases. The trigger signal may be initiated, for example, by a contact (either normally open or normally closed) that changes state when the port disconnect trigger mechanism is activated.

FIG. 3A illustrates at 301 an example implementation of a port disconnect trigger mechanism 332 used in conjunction with decoupling a downstream end of a hybrid data-power cable 120 (such as for disconnecting cable 120 from port 131 of intelligent remote distribution node 130, for example). In this example, hybrid data-power cable 120 has the downstream end hybrid data-power cable termination 310 plugged into a hybrid data-power port 330. The hybrid data-power port 330 includes the hybrid data-power port disconnect mechanism 332 located proximate to termination 310. It should be appreciated that portions of one or both of the termination 310 and port 330 may form at least part of the hybrid data-power port disconnect mechanism 332. In some embodiments, manipulation of the disconnect mechanism 332 sends a signal to a port controller 340 which disables one or more downstream ports 342 to stop the draw of current through cable 120 and port 330 to prevent arching when the cable is removed. The mechanical interlock subsequently releases to allow removal of the cable termination 310 (and thus cable 120) from port 330. Once remove, the upstream port feeding cable 120 (which may be from the PSE or an upstream intelligent remote distribution node) will detect a loss of connectivity with port 330 and then remove voltage from the upstream port feeding cable 120. For example, in one embodiment the upstream port may continue transmitting polling signals when the port is powered, and through a lack of response to the polling signals detect when a cable has been disconnected.

FIG. 3B illustrates at 302 another example implementation of a port disconnect trigger mechanism 362 used in conjunction with decoupling an upstream end of a hybrid data-power cable 120 (such as for disconnecting cable 120 from port 111 PSE 110, for example, or disconnecting a cable 120 from the managed gated pass-through port 132 of node 130). In this example, the hybrid data-power cable 120 has an upstream cable termination 350 plugged into a hybrid data-power port 360. The hybrid data-power port 360 includes a disconnect mechanism 362 proximate to the hybrid data-power cable terminator 350. In some embodiments, manipulation of the disconnect mechanism 362 sends a signal to a port controller 370 which controls power flow through the hybrid data-power port 360. Upon receiving the signal the port controller 370 disconnects (or disables) hybrid data-power port 360 to curtail the current flow through cable 120. The mechanical interlock subsequently releases to allow removal of the upstream cable termination 350 (and thus cable 120) from port 360. Likewise, the port controller 370, having received the signal from the disconnect mechanism 362, can remove voltage from port 360.

Returning to FIG. 1, each intelligent remote distribution node 130 powered by PSE 110 may step down the electrical voltage it receives from the received voltage to a lower voltage which is what it supplies to its local ports 133 to feed power to connected remote powered devices 134. In some implementations, when converting the received voltage to a voltage for distribution to the remote powered device 134, the intelligent remote distribution node 130 may compensate for any voltage loss in the received voltage to provide a desired target voltage to the remote powered devices. Communications and power-up sequencing between an intelligent remote distribution node 130 and any remote powered devices 134 may be achieved through known standards based protocols such as IEEE 802.3x Power-over-Ethernet (PoE IEEE 802.3af-2003), PoE+ (IEEE 802.3at-2009) and other standards known to those of skill in the art. For example, in some embodiments, an intelligent remote distribution node 130, based on the indicated power class of a remote powered device 134 requesting power, may determine (based on an indicated power class) if the intelligent remote distribution node 130 has an adequate remaining power capacity margin for powering that local port 133 to service a newly added remote powered device 134. It should be appreciated that an intelligent remote distribution node 130 may comprise one or more local ports 133, with each port independently operated.

As already mentioned above, each intelligent remote distribution node 130 may further comprise a second, or "managed gated pass-through," hybrid power-data port 132 so that network 100 may be structured as a cascading daisy chain of intelligent remote distribution nodes 130. In some embodiments, the managed gated pass-through hybrid power-data port 132 will function in that same manner as described above with respect to a hybrid power-data port 111 from PSE 110. That is the managed gated pass-through port 132 will remain de-energized until a connection with a properly recognized and verified downstream intelligent remote distribution node 130 is authorized. In some embodiments, authorization may be performed as described above, such as illustrated by FIG. 2. Additional intelligent remote distribution nodes 130 may be similarly cascaded up until the power management system 105 determines that the supplying PSE port 111 can no longer support any additional intelligent remote distribution nodes. This determination may be based on the power class ratings of the other nodes previously connected. For example, if PSE port 111 is rated for 120 watts and already has a connected load, based on power class ratings, that sum to 100 watts, then power management system 105 will not authorize powering of any additional node with a power class that could add more than 20 watts demand onto the daisy-chain fed from that particular port 111.

In one embodiment, Power Management System 105 can control each port in network 100 to manage where voltage power is distributed. For example, Power Management System 105 may control the external ports that supply ES2 voltages between devices in network 100, or ES1 voltages to remote powered devices 134. Power Management System 105 can also control internal ports within the intelligent remote distribution nodes 130. For example, as discussed in greater detail below, the intelligent remote distribution nodes 130 may comprise internal ports that control power flow between ES2 and ES1 buses within the nodes.

To address potential system electrical faults, in some embodiments, power flow measurements through external and/or internal ports are provided to the power management system 105. When the power management system 105 observes that power flow through a port is greater than what is expected, it may either de-energize that overloaded port, or an upstream port feeding the overloaded port. In other embodiments, power management system 105 can perform a graceful shedding of loads when power demands unexpectedly exceed an available power budget. For example, while an instantaneous power demand may momentarily cause an intelligent remote distribution node 130 to exceed its expected maximum demand, the current through the PSE port 111 feeding that load may still remain below its total rated current capacity so that power management system 105 may allow the unexpected power demand to continue for some predetermined period before attempting to shut down the affected port. Further, the power management system 105 may attempt to isolate the overload condition down to a specific local port 133 of an intelligent remote distribution node 130 so that fault mitigation adversely affects the fewest number of connected devices possible.

In other embodiments, various loads connected to a PSE 110 may be assigned a priority ranking used for planned load shedding events. For example, when an overload condition is sensed at a particular PSE port 111, loads may be shed in a priority order with the least important loads dropped first, the second least important loads dropped next, and so on until the fault condition clears. In this way, the most important loads (i.e. the higher assigned priority loads) are only dropped if shedding of lower priority loads fails to cure the overload condition. For example, in one embodiment, power management system 105 may maintain safety lighting lights while accent lighting loads are shed. In some embodiments, power management system 105 may monitor and meter power usage, for example, by receiving from the various port controllers in the system data regarding power usage at each port. In some embodiments, this information may be used to ration power and/or used to charge specific users based on power consumed.

Figure 4:
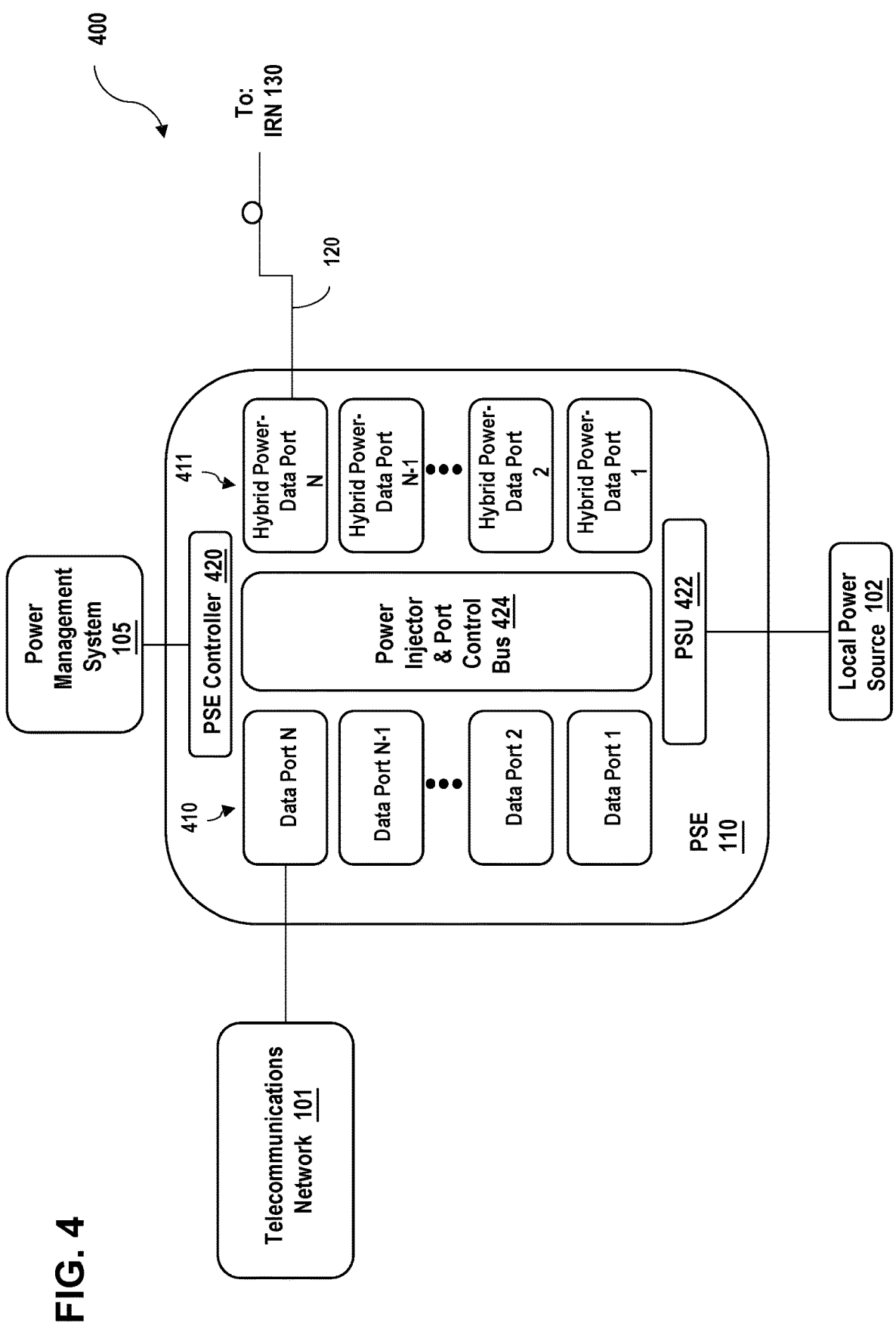
FIG. 4 is a diagram illustrating a power sourcing equipment device of one embodiment of the present disclosure.

FIG. 4 is a diagram illustrating generally at 400 a PSE device such as PSE 110 discussed above. As such, descriptions of device elements and functions with respect to the PSE 400 of FIG. 4 apply to like named elements and functions for PSE 110 in FIG. 1 and vise verse. As shown in FIG. 4, PSE 400 comprises one or more data ports 410, one or more hybrid power-data ports 411, a power sourcing equipment controller 420, a power injector and port control bus 424, and a power supply unit 422. PSE 400 is energized by a local power supply 102. More specifically, power supply unit 422 is coupled to the local power source 102, which may be either an AC or DC power source, energized for example by an electric utility, a renewable energy source, an uninterruptable power supply (UPS), an electrical storage system such as a battery set, or some combination of such power sources. Power supply unit 422 convers the power provided by the local power supply 102 into one or more voltage types and levels for operating PSE 400 as well as for providing the voltages to the hybrid power-data ports 411 for application to conductor pairs of connected hybrid power-data cables 120. In some embodiments, power supply unit 422 may internally comprise multiple and/or redundant power supply circuitry for converting the power provided by the local power supply 102 into one or more voltage types and levels for operating PSE 400. For example, in some embodiments, power supply unit 422 comprise N+1 redundancy meaning that if it requires N internal power supplies to adequately supply power to operate PSE 400 and its hybrid power-data ports 411 at full capacity, then power supply unit 422 comprises at least one additional redundant internal power supply which may be utilized as a built-in-spare. At least one of the data ports 410 is communicatively coupled to the telecommunications network 101 to provide the voice, data and/or video services to the remote powered devices 134. In various different implementations, data ports 410 may be coupled to telecommunications network 101 via electrical conductors, fiber optics, wireless data links, or some combination thereof. Power sourcing equipment controller 420 communicates with the power management system 105 and operates the power injector and port control bus 424 to individually enable and disable each of the hybrid power-data ports 411. The power injector and port control bus 424 communicates to the individual ports 411 to have them provide power in the correct sequence and at the right time.

In one embodiment, in operation, PSE 400 implements the power-up sequence described above in FIG. 2. The PSE controller 420 utilizes the power injector and port control bus 424 to transmit the polling signal from hybrid power-data ports 411 that are currently unused and unpowered. When a response to the polling signal is received from a newly connected intelligent remote distribution node 130, the PSE Controller 420 communicates the power class and other information to the power management system 105. If powering of the newly connected intelligent remote distribution nodes 130 is permitted by the power management system 105, PSE Controller 420 configures the power injector and port control bus 424 to complete the power-up handshake with the intelligent remote distribution node 130, establish data connectivity between telecommunications network 101 and the intelligent remote distribution node 130 through that hybrid power-data port 411, and inject power at ES2 voltages onto the conductors of hybrid power-data cable 120 to operate the intelligent remote distribution node 130. Each of the hybrid power-data ports 411 constitute one of the external ports mentioned above for which power flow may be individually enabled, disabled, monitored, and metered as described above.

Figure 5:
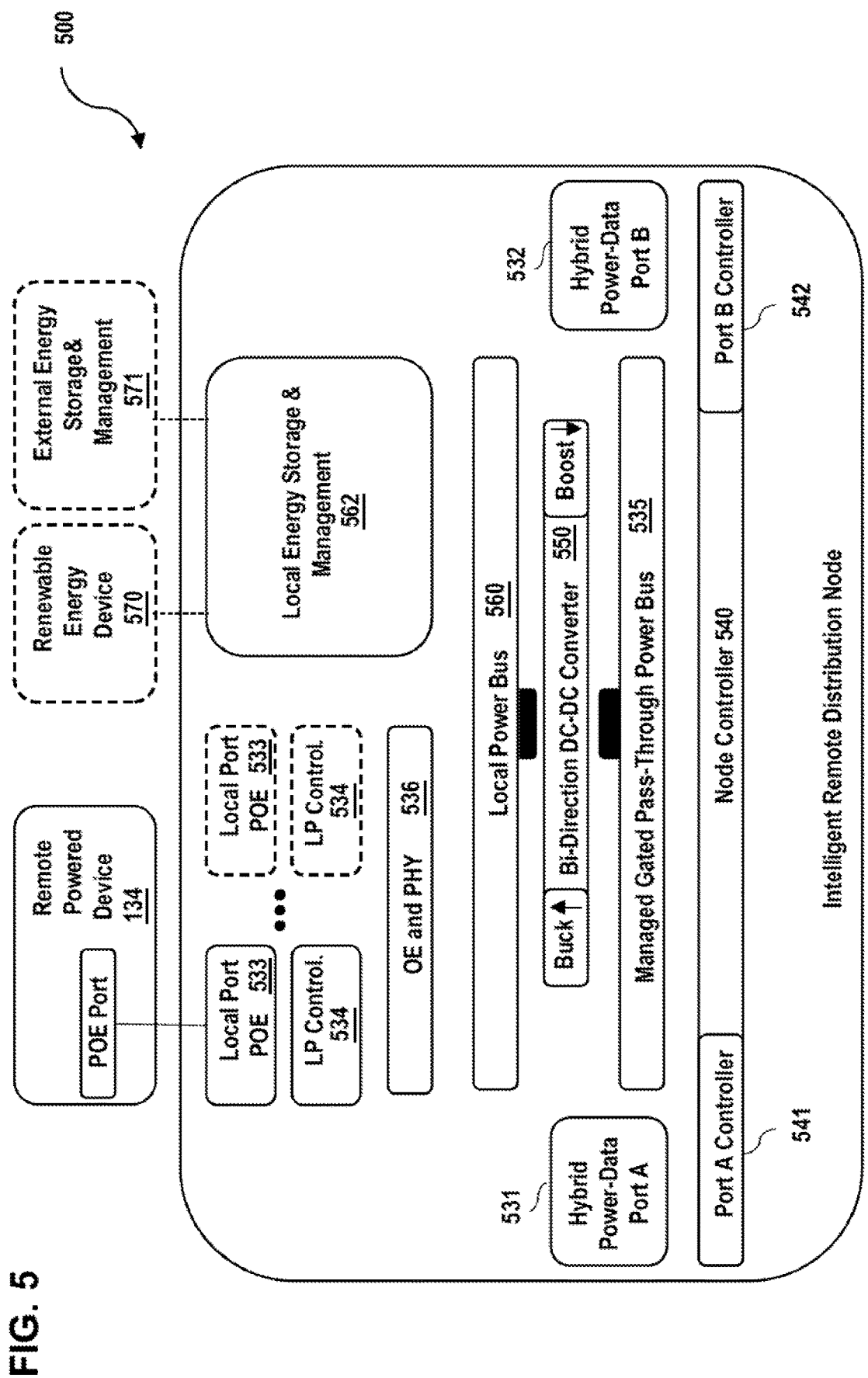
FIG. 5 is a diagram illustrating an intelligent remote distribution node of one embodiment of the present disclosure.

FIG. 5 is a diagram illustrating at 500 an intelligent remote distribution node such as one of the intelligent remote distribution nodes 130 discussed above. As such, descriptions of device elements and functions with respect to the intelligent remote distribution node 500 of FIG. 5 apply to like named elements and functions for intelligent remote distribution nodes 130 in FIG. 1 and vise verse. Intelligent remote distribution node 500 functions to distribute the power it receives via the hybrid power-data cable 120 for consumption by one or more remote powered devices 134. Each intelligent remote distribution node 500 receives a relatively high-voltage signal (such as an ES2 voltage signal, for example) and drops the voltage down to a relatively low-voltage electrical signal (such as an ES1 voltage signal, for example) which can be distributed to the remote powered devices 134 over standard data cables and using known standards based protocols such as Power-over-Ethernet (PoE), PoE+, and other standards known to those of skill in the art.

Intelligent remote distribution node 500 comprises a first hybrid power-data port 531 (corresponding to hybrid power-data port 131) and a second hybrid power-data port 532 (corresponding to hybrid power-data port 132) that are connected via a managed gated pass-through power bus 535. The first hybrid power-data port 531 is controlled by a first port controller 541. The second hybrid power-data port 532 is controlled by a second port controller 542. In one embodiment, during a startup sequence, the first port controller 541 receives the polling signal from an upstream device over a hybrid cable 120 and builds up a stored charge by power harvesting the polling signal. Once sufficiently charged, the first port controller 541 becomes operational and sends back the reply to the polling signal, including information about node 500 such as its power class rating. This information is conveyed to the power management system 105. If power management system 105 determines that intelligent remote distribution node 500 may be energized, the upstream hybrid power-data port coupled to the first hybrid power-data port 531 is powered (for example, at an ES2 voltage level) and that power is delivered to port 531 via conductors of the hybrid cable 120 coupling the two ports together. Once the remote node 500 is receiving power, node controller 540 takes over control of power flow through, and between, first hybrid power-data port 531, second hybrid power-data port 532 and managed gated pass-through power bus 535.

It should be understood that managed gated pass-through power bus 535 is not simply a straight pass-through, but comprises a switched electrical bus that may be enabled and disabled by node controller 540 to power and/or depower the second hybrid power-data port 532. In some embodiments, node controller 540 may transmit a polling signal to the second hybrid power-data port 532 to detect when another intelligent remote distribution node 500 has been added. Based on a received response to the polling signal and authorization from power management system 105, node controller 540 may switch on managed gated pass-through through power bus 535 to enable power flow from the first hybrid power-data port 531 to the second hybrid power-data port 532. Switching of the managed gated pass-through power bus 535 may also be selectively directional, meaning that it may be selective switched to either permit power flow from the first hybrid power-data port 531 to the second hybrid power-data port 532, or switched to permit power flow from the second hybrid power-data port 532 to the first hybrid power-data port 531. As another alternative, the managed gated pass-through power bus 535 may also be selectively switched to simultaneously permit power flow in from both the first hybrid power-data port 531 and the second hybrid power-data port 532 so that intelligent remote distribution node 500 (and powered devices fed from it) may receive power from more than one source at a time.

In some embodiments, a string of connected intelligent remote distribution nodes may form a closed ring with each end of the string coupled to a port 111 of the PSE 110. Such a configuration provides the ability to power the string of connected intelligent remote distribution nodes from either end and switch when desired. Accordingly, in some embodiments, an intelligent remote distribution node 500 may instead be powered from the second hybrid power-data port 532 with the first hybrid power-data port 531 serving as the managed gated pass-through hybrid power-data port. If upon initialization the intelligent remote distribution node 500 receives a polling signal via both ports 531 and 532, node controller 540 may determine which port to use to complete the startup sequence based on a predefined criteria. Also with such a configuration, if there is a loss of power from one PSE port, the nodes may each self-switch over to the other PSE port.

Intelligent remote distribution node 500 also comprises a DC-to-DC converter 550 that electrically couples the managed gated pass through power bus 535 to a local power bus 560 and steps down the ES2 voltage from the managed gated pass through power bus 535 to an ES1 or other voltage for distribution to the remote powered devices 134. In some embodiments, DC-to-DC converter 550 may comprise a Bi-Directional DC-to-DC converter which can be switched (for example by node controller 540 or power management system 105) between buck and boost operating modes. That is, in buck mode, DC-to-DC converter 550 enables power flow and a voltage step-down from managed gated pass-through power bus 535 to local power bus 560. This would be the typical operating mode of intelligent remote distribution node 500 to send power to the local ports 533 and transport data. DC-to-DC converter 550 may also operate in a boost mode that enables power flow and a voltage step-up from local power bus 560 to managed gated pass-through power bus 535. In some embodiments, DC-to-DC converter 550 may adjust the conversion of voltage from bus 535 to 560 in order to compensate for voltage losses affected the voltage level of bus 535. Operating in boost mode would be appropriate where a local power source (such a local energy storage device or other local energy supply) is being used to supply power to at least one other intelligent remote distribution node 500 over a hybrid cable 120.

Each of the hybrid power-data ports 511 and 542, and the local port 533 constitute one of the external ports for which power flow may be individually enabled, disabled, monitored, and metered as described above. The DC-to-DC converter 550 of each intelligent remote distribution node 500 constitutes or otherwise may further comprise an internal port which may be individually enabled, disabled, monitored, and metered as described above. For example, where a fault or heavy current drawn by intelligent remote distribution node 500 has been detected, DC-to-DC converter 550 may be switched off to disconnect power to the local ports 533 while still permitting pass-through of power between hybrid power-data ports 531 and 532.

In one embodiment, intelligent remote distribution node 500 may further comprise an internal local energy storage and management device 562. In alternate embodiments, internal local energy storage and management device 562 may comprise, for example, a rechargeable battery or a capacitive chargeable device. Incorporation of the local energy storage and management device 562 may provide a benefit in applications where power demand from the remote powered devices 134 fluctuate over time. Under such conditions, intelligent remote distribution node 500 can use power from the local energy storage system to average out the power demand for that node. When demand from the local powered devices 134 is lower, available excess power delivered to node 500 can be used to charge the local energy storage device. When demand from the local powered devices 134 is higher, a portion of the power may be supplied from the local energy storage and management device 562. For example, if a node 500 powers building system lights from 9 am to 5 pm, then from 5 pm to 9 am, local energy storage and management device 562 can be charging so as to be able to provide supplement power for the lights the next morning. Averaging power draw from the PSE 110 can also enable the hybrid cables 120 to span greater distances because the maximum IR losses on the cable are reduced by the averaging. Similarly, in some embodiment, the local energy storage and management device 562 may further be coupled to a renewable energy device 570, such as a photovoltaic device, or and external energy storage and management device 571 to further provide a supplemental power source that can offset the need to draw power from the PSE 110. Power from a local energy storage and management device 562 or renewable energy device 570 may be used to temporarily maintain operation of a node 500 during a power loss. For embodiments where a string of connected intelligent remote distribution nodes forms a closed ring, power from a local energy storage and management device 562 or renewable energy device 570 may maintain power to operate the node during a transition period as the node switches its power source between ports 531 and 532.

In order to manage and control power and data flow between the intelligent remote distribution node 500 and the remote powered devices 134, the intelligent remote distribution node 500 may further comprise one or more local ports 533 each with an associated local port controller 534. To enable power deliver from a local port 533 to a remote powered device 134, the local port controller 534 implements a power-up sequence through a known standards based protocol such as Power-over-Ethernet (PoE), PoE+, and other standards known to those of skill in the art. For implementations where data is carried over optical fibres, the node 500 may comprise an Optical/Ethernet interface and PHY 536 to transfer data between the fiber and the data cable (for example an RJ45 cable) coupled to the local port 533.

Figure 5A:
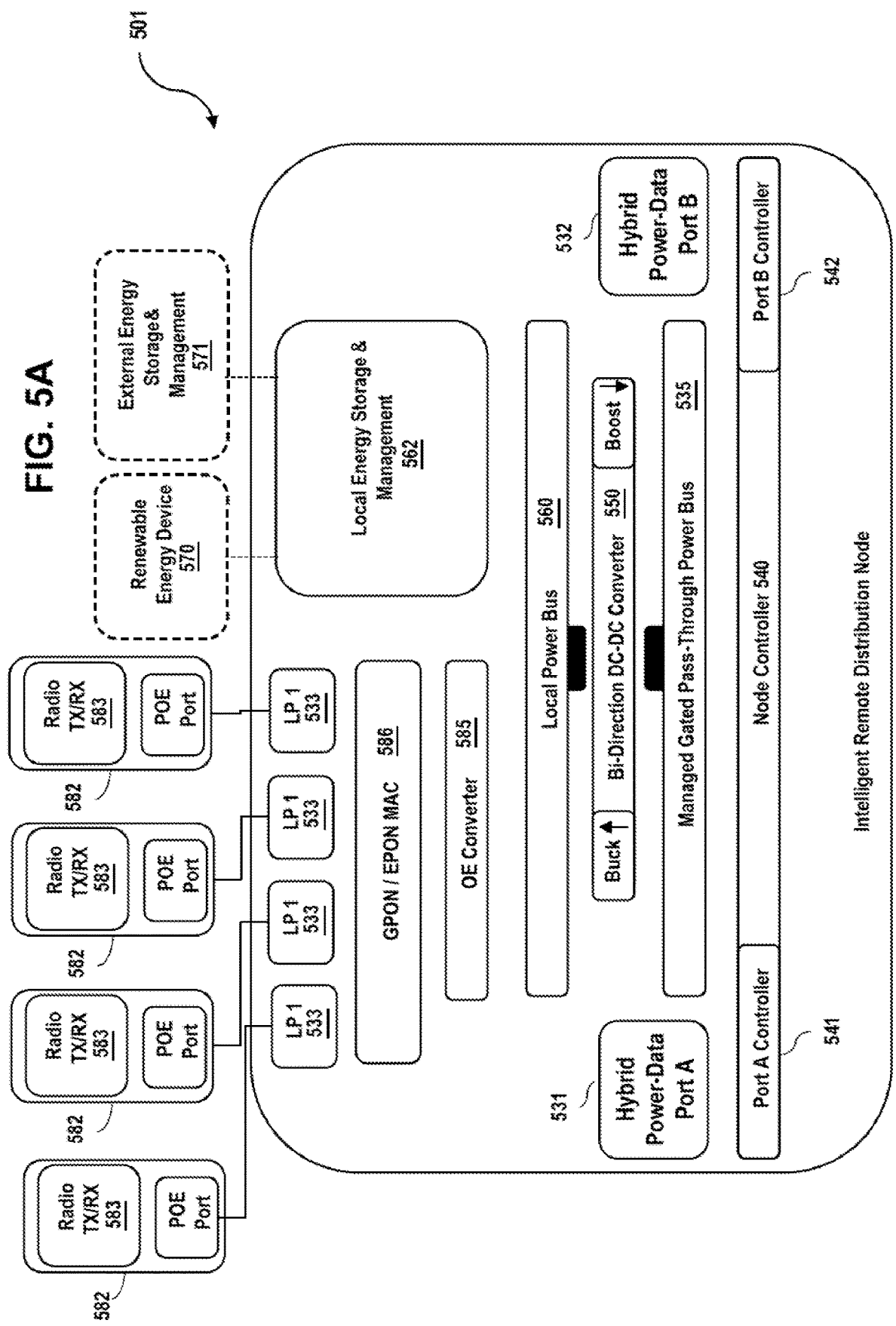
FIG. 5A-5C are diagrams illustrating alternate intelligent remote distribution node embodiments of the present disclosure.

FIG. 5A provides one alternative implementation of an intelligent remote distribution node 500 (shown at 501) comprising a plurality of local ports 533. Here, each of the local ports 533 is coupled to a respective remote powered device 582 comprising a wireless radio transceiver 583, where the intelligent remote distribution node 501 delivers power and data connectivity to the respective remote powered device 582. In one embodiment, intelligent remote distribution node 501 further comprises a passive optical network (PON) media access control (MAC) layer 586 (which may be implemented, for example, as either an Ethernet passive optical network (EPON) or a Gigabit passive optical network (GPON)) interconnecting the Optical/Ethernet converter 585 with the local ports 533. In one embodiment, each of the respective remote powered device 582 are powered via the local ports 533 using, for example, known standards based protocols such as Power-over-Ethernet (PoE), PoE+, or other standard known to those of skill in the art. In one embodiment, each wireless radio transceiver 572 may implements wireless access point, or other wireless or cellular connectivity technology, enabling mobile devices to connect to services provided by telecommunications network 101.

Figure 5B:
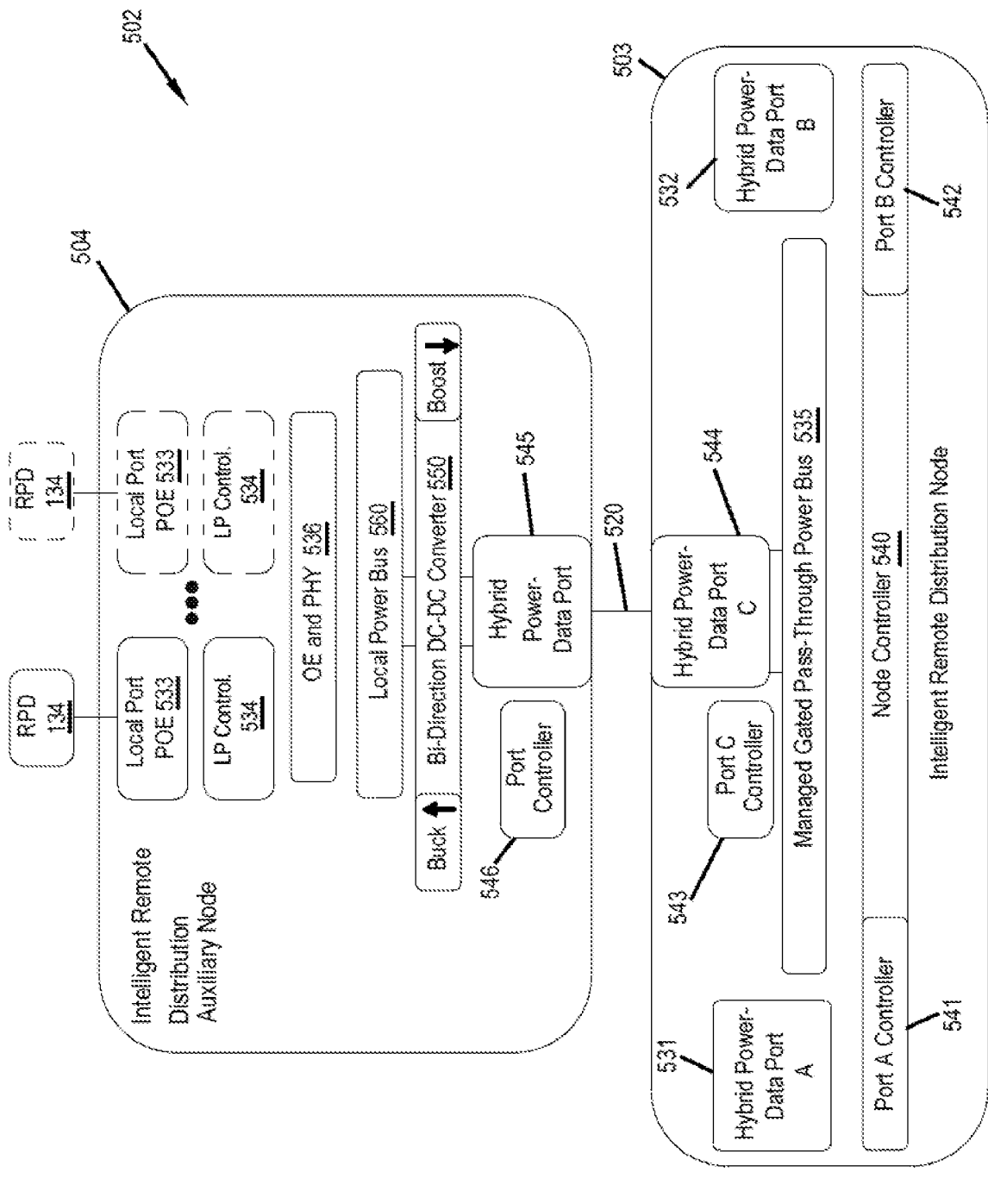

FIG. 5B provides another alternative implementation of an intelligent remote distribution node 500 (shown at 502) where the functionality described above for the intelligent remote distribution node 500 is separated into two separate devices—an intelligent remote distribution node 503 and an intelligent remote distribution auxiliary node 504, which are coupled together by a hybrid power-data cable 520. Here, the intelligent remote distribution node 503 handles the functions the high voltage distribution while the intelligent remote distribution auxiliary node 504 handles the functions of converting the high voltage for distribution to the local power bus and distributing to one or more remote powered devices 134. In one embodiment, in addition to the Hybrid Power-Data ports 531 and 532, Controllers 541 and 541, node controller 540 and managed gated pass-through power bus 535, the intelligent remote distribution node 503 includes a third external Hybrid Power-Data port (shown at 544) branched off from the managed gated pass-through power bus 535, and a third Port Controller 543 associated with the additional external Hybrid Power-Data port 544. The intelligent remote distribution auxiliary node 504 includes a corresponding Port Controller 546 and Hybrid Power-Data port 545 coupled to the DC-DC Converter 550. The Hybrid Power-Data port 544 is coupled to the Hybrid Power-Data port 545 of the intelligent remote distribution auxiliary node 504 via the cable 520. Hybrid Power-Data port 544 and Hybrid Power-Data port 545 essentially provide the functionality of the internal port described above with respect to node 500. That is, through the control of ports 544 and 545, power flow between the intelligent remote distribution node 503 and intelligent remote distribution auxiliary node 504, and therefore power flow between the Managed Gated Pass-Through Power Bus 535 and DC-to-DC Converter 550 can be regulated.

Figure 5C:
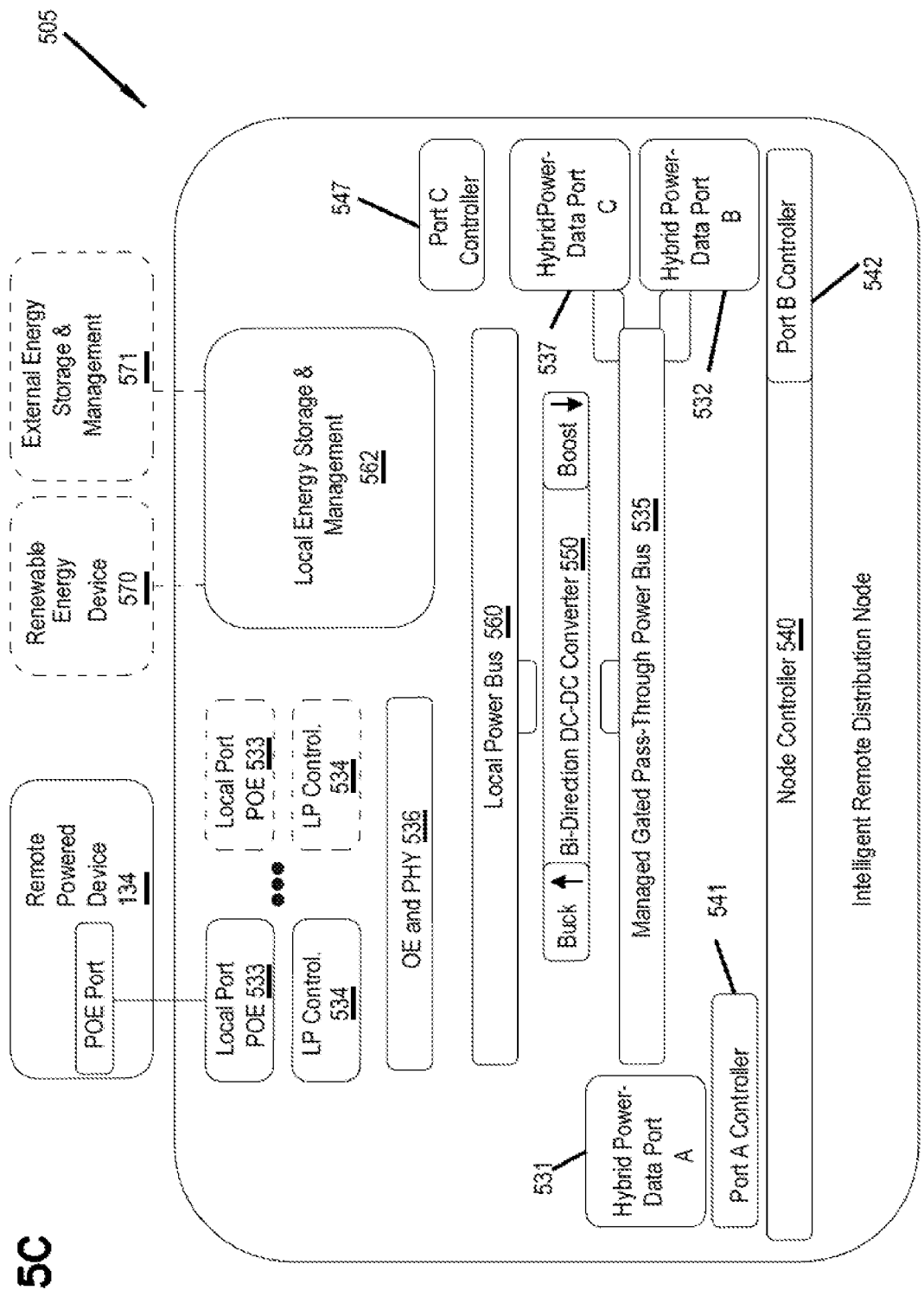

FIG. 5C provides another alternative implementation of an intelligent remote distribution node 500 (shown at 505) where the node comprises a third hybrid power-data port 537 and associated Port Controller 547 which provides the Managed Gated Pass-Through Power Bus 535 with a second pass-through hybrid power-data port such as port 132 and 532 discussed above. That is, the third hybrid power-data port 537 and port controller 547 provide the same functionality as described for hybrid power-data port 532 and port controller 542. Inclusion of the third hybrid power-data port 537 provides additional switching configuration options for configuring an access network. For example, in embodiments that incorporate dual pass-through ports such as node 505, the node controller 535 may manage pass-through power flow between port 531 and port 532, port 537, or both.

Figure 6A:
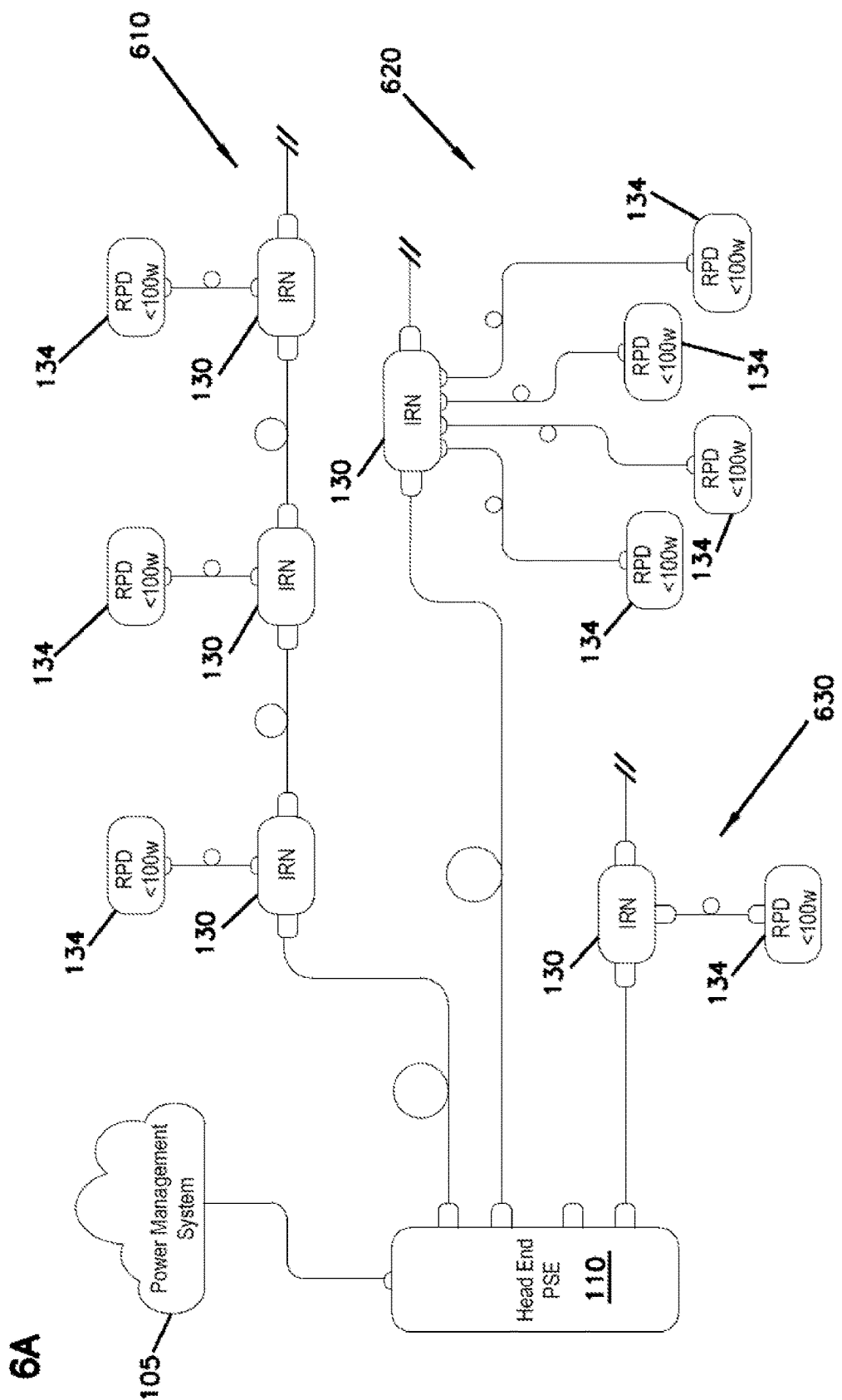
FIGS. 6A and 6B are diagrams illustrating example topologies for a power distributing fiber access network of one embodiment of the present disclosure.
Figure 6B:
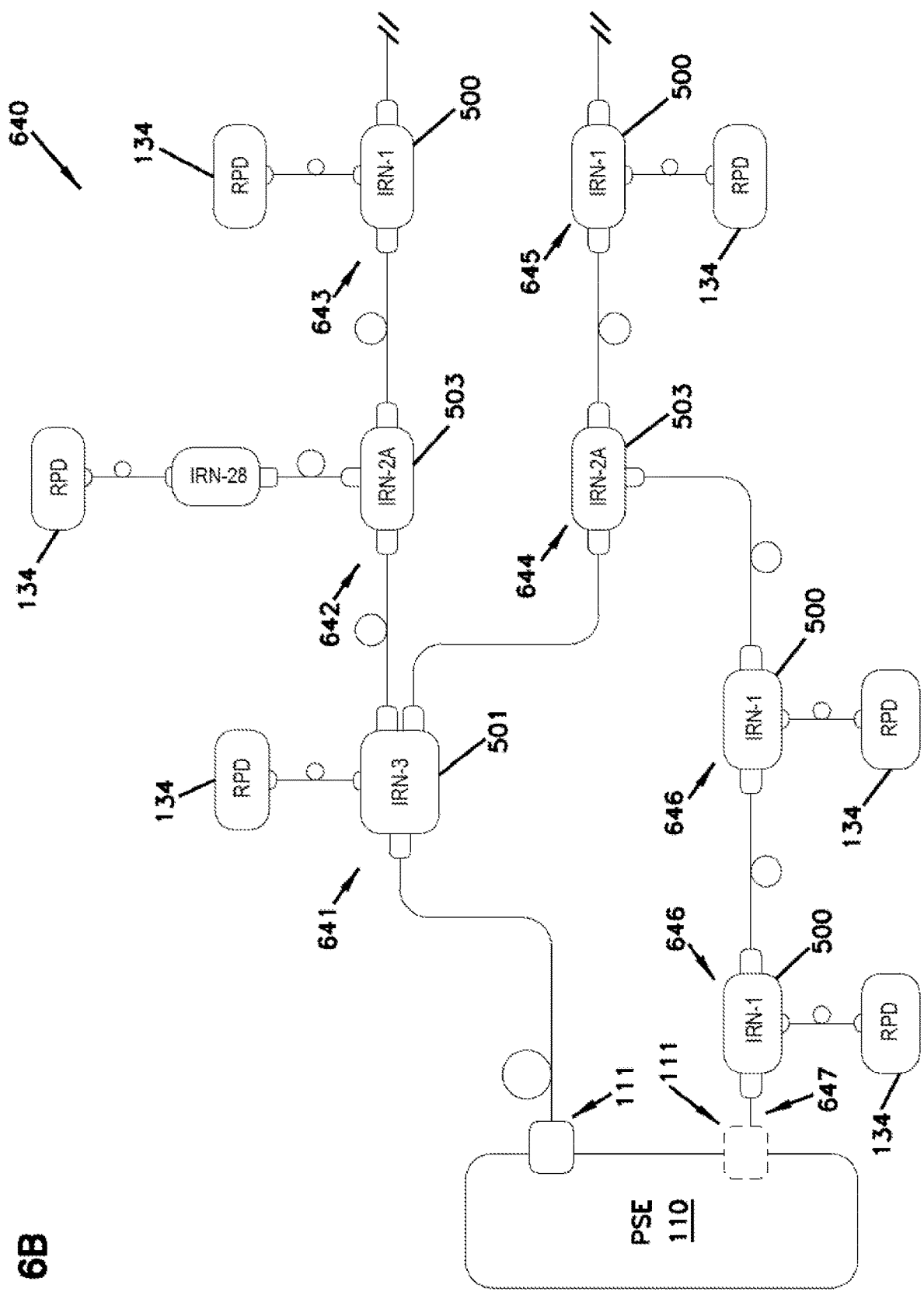

FIGS. 6A and 6B are diagrams illustrating various example network topologies which may be used in power distributing fiber access network 100 for connecting intelligent remote distribution nodes with a PSE device. It should be understood that these example network topologies are provided for illustrative purposes only and embodiments are not intended to be limited to only those example network topologies shown. It is expressly contemplated that different embodiments of power distributing fiber access network 100 may include any combination and/or configuration of remote distribution nodes coupled directly or indirectly to a PSE device A daisy-chain topologies, shown in FIG. 6A at 610, may be used to similarly distribute power to each of a plurality of connected remote powered devices 134, each having a single load sharing the power delivered by a hybrid power-data port of PSE 110.

A clustered load topology, shown at 620, may be used to power multiple remote powered devices 134 from a single the intelligent remote distribution node 130. This topology may be used, for example, where multiple remote powered devices 134 share a common function or location. For example, intelligent remote distribution node 130 may power a selection of divers devices (lighting, cameras, sensors, access points) all located in a single room. In such an implementation, control signals sent to a single intelligent remote distribution node 130 may be used to quickly isolate room from rest of the system and may be useful for fault management. Alternatively, the single intelligent remote distribution node 130 may power all emergency lighting across multiple rooms.

A single load topology, shown at 630, may be used where all power available from a hybrid power-data port of PSE 110 is dedicated to a single remote powered device 134.

FIG. 6B illustrates example network topologies combining a PSE and the various alternative intelligent remote distribution nodes discussed above. In particular, FIG. 6B at 640 illustrates a tree structure topology. Shown at 641 is an intelligent remote dual pass-through distribution node 501 is coupled to one of the hybrid power-data ports 111 of PSE 110 and feeds a remote powered device 134. Shown at 642 is an intelligent remote distribution node 503 fed from a first pass-through port of the intelligent remote dual pass-through distribution node 501. This intelligent remote distribution node 503 is coupled to an intelligent remote distribution auxiliary node 504 that feeds a remote powered device 134. The same intelligent remote distribution node 503 shown at 642 also feeds a downstream intelligent remote distribution node 500 shown at 643, which feeds a remote powered device 134.

Shown at 644 is an intelligent remote distribution node 503 fed from a second pass-through port of the intelligent remote dual pass-through distribution node 501 shown at 641. The intelligent remote distribution node 503, shown at 644, feeds a downstream intelligent remote distribution node 500, shown at 645, which feeds a remote powered device 134. As opposed to the intelligent remote distribution node 503 at 644 feeding an intelligent remote distribution auxiliary node 504, as shown at 646, it may instead feed another chain of downstream intelligent remote distribution nodes 500 which each feeds a remote powered device 134. Also as shown generally at 647, any portion of the network topology 640 may be optionally reverse fed from another hybrid power-data ports 111 of PSE 110. Such a configuration provides the ability to power the string of connected intelligent remote distribution nodes from multiple points and switch power flow direction when desired.

In one embodiment, each intelligent remote distribution node 130 of a network has a unique identifier or address, which may be assigned to the node at power up. In one embodiment the address assignment is allocated by the power management system 105, for example as part of the handshake sequence described above that authorizes a new remote distribution node to join the network. The power management system 105 may then send control commands to an individual remote distribution node 130 without the necessity of knowing where in the topology of a particular network that node is connected. That is, the power management system 105 may the send a control command to an individual remote distribution node 130 (or selected group of nodes) by addressing the command for that node and having the PSE 110 transmit that control command via a control channel. The individual remote distribution node 130 will monitor that control channel and respond to control commands that are applicable to it its allocated network address. Such control commands may be issued to control internal and/or external ports, power flows and/or power flow direction, and query information from connected remote distribution nodes. In one embodiment, the control channel is implemented as an out-of-band communication system running across the network over the power providing electrical conductors. As such, the above discussed initial power-up handshake sequences, control commands and other overhead information for managing operation of the nodes and network may be carried over this control channel.

In one embodiment, the intelligent remote distribution nodes 130 described above implements fiber indexing such as described below with respect to any of FIGS. 7-16.

It should be understood that the features and elements described herein with respect to FIG. 7-16 may be used in conjunction with, in combination with, or substituted for elements of any of the other embodiments discussed herein with respect to FIG. 1-6, and vice versa. Further, it should be understood that the functions, structures and other description of elements for embodiments described herein may apply to like or similarly named or described elements across any of the figures and/or embodiments describe therewith.

Figure 7:
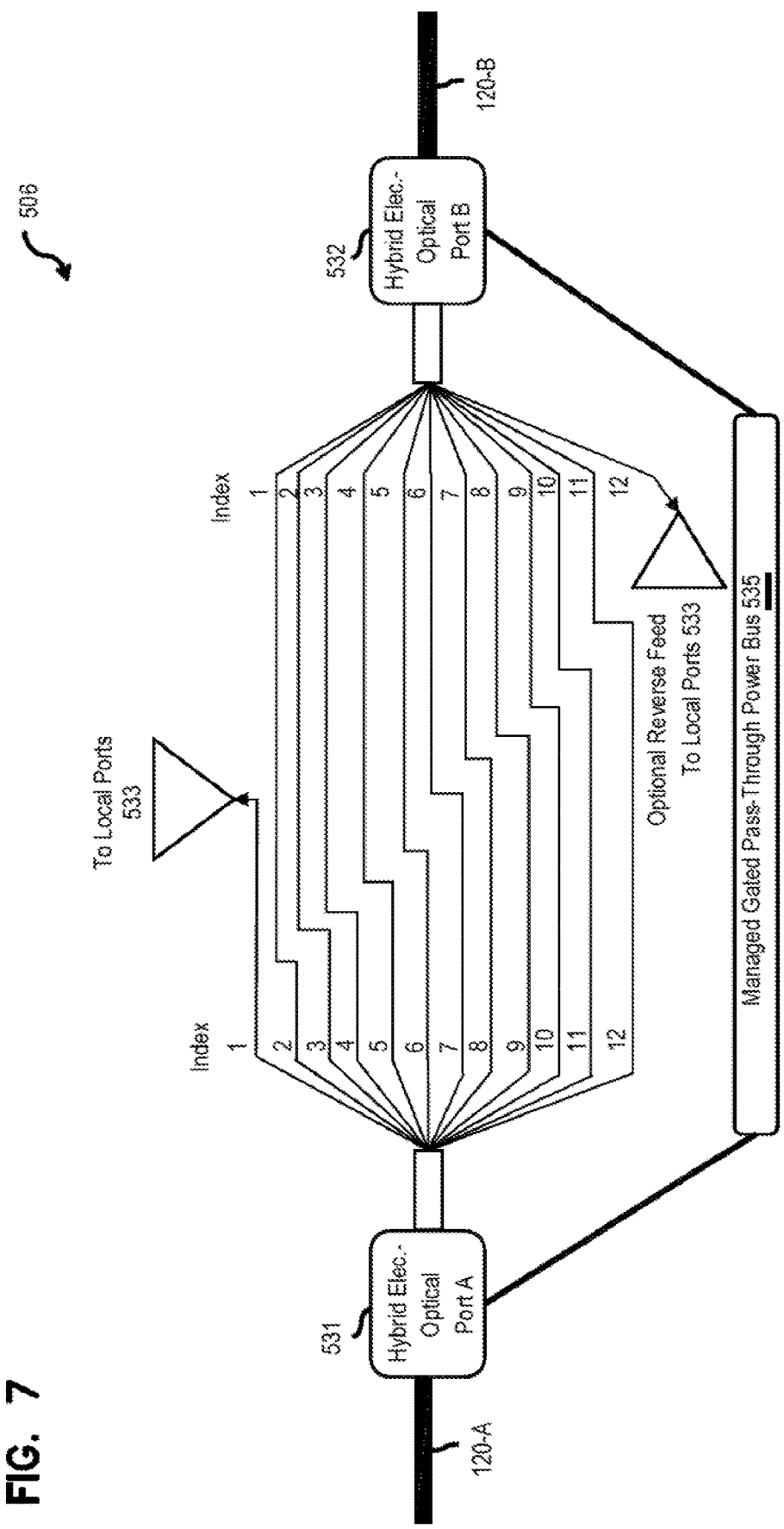
FIG. 7 is a diagram illustrating fiber indexing implemented through an intelligent remote distribution node of one embodiment of the present disclosure.

For example in one embodiment, as shown in FIG. 7 generally at 506, a first multi-fiber hybrid power-data cable 120-A is coupled to a first hybrid power-data port 531 of an intelligent remote distribution node 130 (which in alternate embodiments may be implemented, for example, using any of the intelligent remote distribution nodes described herein). The multiple fibers of the multi-fiber hybrid power-data cable 120-A are indexed, meaning that each fiber is indexed has an identifying number. In one embodiment, the first fiber of the multi-fiber hybrid power-data cable 120-A is assigned to transport data that is intended for communication via the local ports 533 of that intelligent remote distribution node 130. Accordingly, within the intelligent remote distribution node 130, the first fiber is terminated to a first connector within the first hybrid power-data port 531 which is communicatively coupled to the local ports 533. The data carried over the remaining fibers of the hybrid power-data cable 120-A is re-indexed as it passes through the intelligent remote distribution node to the second hybrid power-data port 532. That is, the second fiber of the multi-fiber hybrid power-data cable 120-A is terminated to first connector within the first hybrid power-data port 531, a third fiber of the multi-fiber hybrid power-data cable 120-A is terminated to third connector within the first hybrid power-data port 531, and so on for the remaining fibers of the multi-fiber hybrid power-data cable 120-A. Although FIG. 7 illustrates fiber indexing for a twelve fiber multi-fiber hybrid power-data cable, it should be appreciated that other implementations includes fiber indexing for multi-fiber hybrid power-data cables having any number of fibers.

With fiber indexing embodiments of the present disclosure, the data carried by each of those remaining fibers appears at the second hybrid power-data port 532 at a shifted index number. For example, the data received via the second connector of the first hybrid power-data port 531 is passed to the first connector of the second hybrid power-data port 532, the data received via the third connector of the first hybrid power-data port 531 is passed to the second connector of the second hybrid power-data port 532, the data received via the fourth connector of the first hybrid power-data port 531 is passed to the third connector of the second hybrid power-data port 532, and so on for the remaining fiber connector ports. As such, when a second multi-fiber hybrid power-data cable 120-B is coupled to the second hybrid power-data port 532, data will be provided on fibers with indexes shifted (in this case shifted down one) with respect to the fiber upon which it was received on the first multi-fiber hybrid power-data cable 120-A. The next intelligent remote distribution node 130 in the chain coupled to the second multi-fiber hybrid power-data cable 120-B will thus receive data intended for its respective local ports 533 on the first connector its respective first hybrid power-data port 531, and pass through the data for the remaining fibers in the same manner described above and re-indexing the fiber connections.

With this configuration, an intelligent remote distribution node 130 does not need to be programed to identify which of the multiple fibers in a multi-fiber hybrid power-data cable it needs to monitor for data intended for its local ports. Incoming data intended for any particular remote distribution node will always appear on the first optical connection port of the first hybrid power-data port 531. This would be true regardless of where along a chain of nodes a particular remote distribution node is positioned. As such, a particular remote distribution node need not know where it is positioned within a chain in order to correctly access the fiber transporting its data. In one embodiment, fiber indexing may also be implemented in a reverse feed direction with respect to data received on its second hybrid power-data port 532. In one such embodiment, reverse feed fiber indexing works in the opposite manner as the forward feed indexing described above. For example, instead of accessing data from the first connector port of the second hybrid power-data port 532, it instead accesses data from the last connector port of the second hybrid power-data port 532 to communicate to its local ports 533. Data received on the remaining connector ports of the second hybrid power-data port 532 are passed through on shifted up indexed ports of the first hybrid power-data port 531 for transport to other upstream devices. In some embodiments, using both forward and reverse feed fiber indexing in a ring network topology provides resilience in terms of the ability to provide power and/or connectivity from either direction to the remote distribution nodes.

Referring now to FIGS. 8-16, a power distributing fiber access network 100 can utilize fiber indexing to simplify the fiber connections in the network. For example, fiber indexing can be used in the daisy-chain topology to extend optical lines along the chain of remote distribution nodes 130. One or more optical lines drop off at each remote distribution node 130. Remaining optical lines are indexed at each remote distribution node 130 so that an active optical line is provided to a first fiber position at an input of each remote distribution node 130.

FIG. 8 illustrates an example implementation 700 of an intelligent remote distribution node 130 suitable for use in the indexing daisy-chain topology of FIGS. 1, 6A or 6B, for example. The intelligent remote distribution node 700 includes a housing 701, a first hybrid power-data connection interface 702 coupled to the housing 701 and a second hybrid power-data connection interface 704 coupled to the housing 701. Each of the first and second hybrid power-data connection interfaces 702, 704 includes a fiber interface 702a, 704a and a power interface 702b, 704b. Each fiber interface 702a, 704a has a plurality of sequential fiber positions 1 to N.

As the term is used herein, a "connection interface" can refer to a male plug connector, a female plug connector, or an adapter port. In some examples, a connection interface is directly attached to the housing 701. In other examples, the connection interface can terminate a stub cable extending out from the housing 701.

As the term is used herein, "sequential fiber positions" refer to fiber positions to which a numerical sequence is assigned. This numerical sequence need not correspond to physical adjacency of the fiber positions at the connection interface. For example, FIGS. 8A-8E illustrate five example numerical sequence schemas that can be applied to the fiber positions. These schemas are merely examples; other numerical sequences can be applied. However, the numerical sequence applied to the fiber positions at the first hybrid power-data connection interface 702 also is applied to the fiber positions at the second hybrid power-data connection interface 704. In certain implementations, the numerical sequence assigned to the first and second hybrid power-data connection interfaces 702, 704 of a first intelligent remote distribution node 700 also are applied to the other intelligent remote distribution nodes 700 in the same daisy-chain.

In each of Figured 8A-8E, twelve fiber positions are shown extending in a row. In other examples, however, the fiber interfaces can include a greater or lesser number of fiber positions (e.g., 8 positions, 24 positions, 96 positions, 144 positions, etc.) that can be arranged in any desired configuration (e.g., multiple rows, clusters, etc.).

Figure 8A:
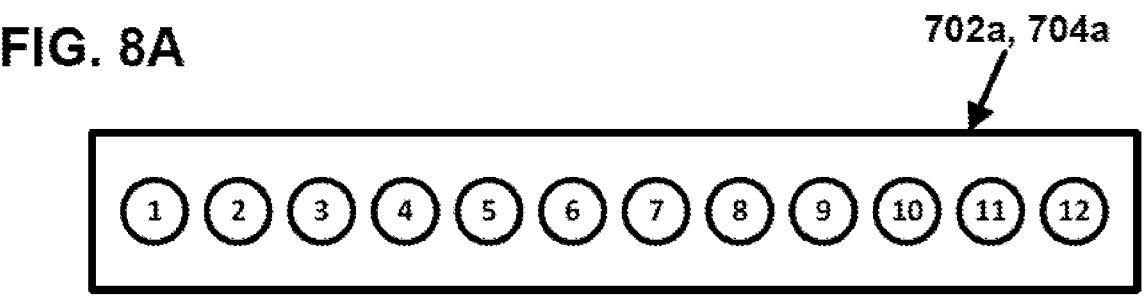
FIGS. 8A-8E illustrate various example numerical sequencing schemas for fiber positions at a fiber interface at a hybrid power-data connection interface.

FIG. 8A illustrates a first example numerical sequence that can be assigned to the fiber positions. In this numerical sequence, the fiber positions are assigned in numerical order to adjacent fiber positions starting at a first end of the fiber interface (e.g., at the left side of the drawing sheet).

Figure 8B:
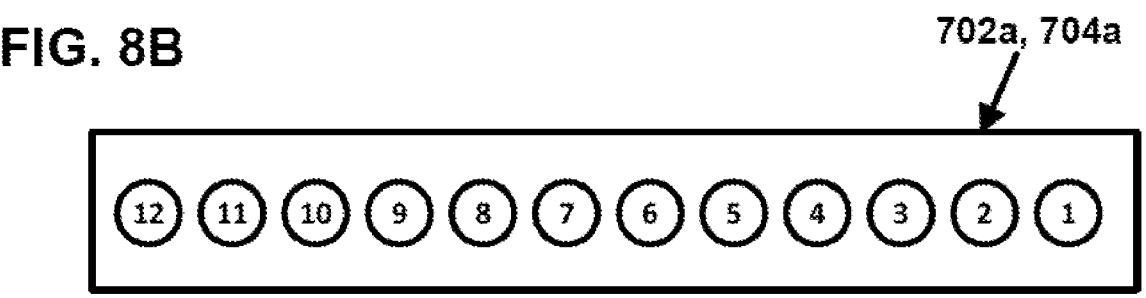

FIG. 8B illustrates a second example numerical sequence that can be assigned to the fiber positions. In this numerical sequence, the fiber positions are assigned in numerical order to adjacent fiber positions starting at an opposite second end of the fiber interface (e.g., at the right side of the drawing sheet).

Figure 8C:
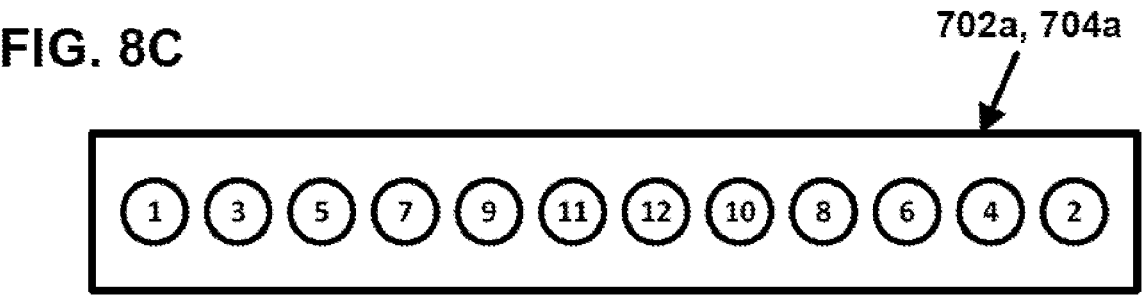

FIG. 8C illustrates a third example numerical sequence that can be assigned to the fiber positions. In this numerical sequence, a first fiber position is located at the first end of the fiber interface and a second fiber position is located at an opposite end of the fiber interface. The fiber positions continue to be numerically assigned at alternate sides of the fiber interface working inwardly as the sequence progresses.

Figure 8D:
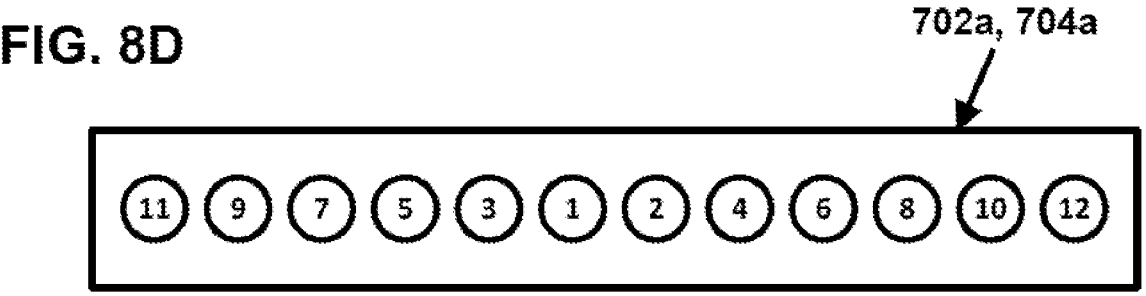

FIG. 8D illustrates a fourth example numerical sequence that can be assigned to the fiber positions. In this numerical sequence, first and second fiber positions are located at a center of the fiber interface. The fiber positions continue to be numerically assigned to alternate sides of the fiber interface working outwardly as the sequence progresses.

Figure 8E:
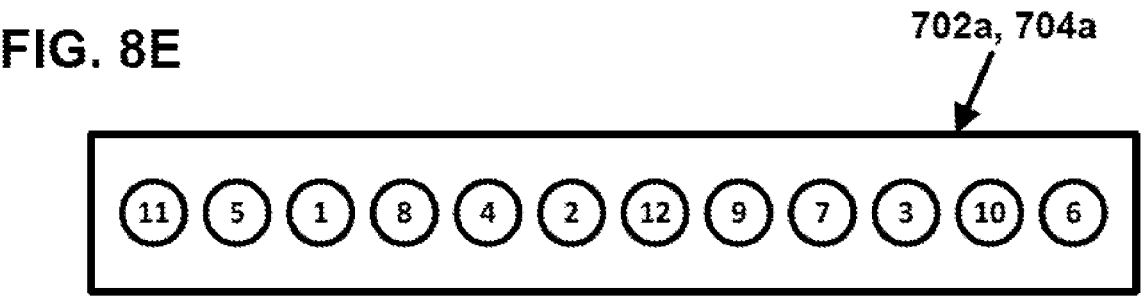

FIG. 8E illustrates a fifth example numerical sequence that can be assigned to the fiber positions. In this numerical sequence, the sequence of the fiber positions has no relation to the physical locations of the fiber positions at the fiber interface.

Referring back to FIG. 8, the intelligent remote distribution node 700 also includes a local hybrid power-data connection interface 706 coupled to the housing 701. The local hybrid power-data connection interface 706 includes a fiber interface 706a and a power interface 706b. The fiber interface 706a of the local hybrid power-data connection interface 706 has fewer optical fibers than the fiber interfaces 702a, 704a of the first and second hybrid power-data connection interfaces 702, 704.

The power interface 702b of the first hybrid power-data connection interface 702 is electrically connected to the power interface 704b of the second hybrid power-data connection interface 704 and to the power interface 706b of the local hybrid power-data connection interface 706.

Multiple optical fibers 710 have first ends 711 disposed at the sequential fiber positions of the fiber interface 702a of the first hybrid power-data connection interface 702. The optical fibers 710 extend from the first ends 711 to opposite second ends 712. At least one 713 of the optical fibers 710 is routed within the housing 701 so that the second end 712 is disposed at the fiber interface 706a of the local hybrid power-data connection interface 706. The remaining optical fibers 714 (i.e., the optical fibers not routed to a local hybrid power-data connection interface 706) extend to the fiber interface 704a of the second hybrid power-data connection interface 704.

The remaining optical fibers 714 are indexed along the sequential fiber positions between the fiber interface 702a of the first hybrid power-data connection interface 702 and the fiber interface 704a of the second hybrid power-data connection interface 704. As the term is used herein, "indexing" refers to a routing scheme where the optical fibers are routed to the fiber positions in accordance with the numerical sequence starting with the first fiber position in the numerical sequence. Accordingly, the first fiber position of the fiber interface 704a of the second hybrid power-data connection interface 704 receives one of the optical fibers 714. It is again noted that the first fiber position in the numerical sequence need not correspond with a left-most or right-most physical location of the fiber interface. The $N^{th}$ fiber position at the fiber interface 704a of the second hybrid power-data connection interface 704 does not receive one of the remaining fibers 714.

Additional information pertaining to indexing can be found in U.S. Pat. No. 9,348,096, the disclosure of which is hereby incorporated herein by reference.

In certain implementations, the intelligent remote distribution node 700 may include multiple local hybrid power-data connection interfaces 706. In the example shown, the intelligent remote distribution node 700 includes two local hybrid power-data connection interfaces 706. Each local hybrid power-data connection interface 706 receives the second end 712 of at least a respective one of the optical fibers 713. In certain examples, the fiber interface 706a of each local hybrid power-data connection interface 706 can receive the second ends 712 of multiple optical fibers 713.

In some implementations, the first hybrid power-data connection interface 702 includes a hybrid port defined by or held by the housing 701. For example, a hybrid adapter defining the hybrid port can be held by the housing 701. In other implementations, the first hybrid power-data connection interface 702 includes a plug connector held by the housing 701. In still other implementations, the first hybrid power-data connection interface 702 includes a hybrid plug connector terminating the first ends of the optical fibers 710 extending out from the housing 701 (e.g., see FIG. 8) to form a hybrid stub cable. The hybrid stub cable also includes a power line extending from the hybrid plug connector, into the housing 701, to the other connection interfaces 704, 706. In an example, the hybrid plug connector is a male connector. In another example, the hybrid plug connector is a female connector.

In some implementations, the second hybrid power-data connection interface 704 includes a hybrid port defined by or held by the housing 701. For example, a hybrid adapter defining the hybrid port can be held by the housing 701. In other implementations, the second hybrid power-data connection interface 704 includes a plug connector held by the housing 701 (e.g., see FIG. 8). In still other implementations, the second hybrid power-data connection interface 704 includes a hybrid plug connector terminating the second ends of the optical fibers 714 extending out from the housing 701 to form a hybrid stub cable. The hybrid stub cable also includes a power line extending from the hybrid plug connector, into the housing 701, to the other connection interfaces 702, 706. In an example, the hybrid plug connector is a male connector. In another example, the hybrid plug connector is a female connector.

In some implementations, the local hybrid power-data connection interface 706 includes a hybrid port defined by or held by the housing 701. For example, a hybrid adapter defining the hybrid port can be held by the housing 701. In other implementations, the local hybrid power-data connection interface 706 includes a plug connector held by the housing 701 (e.g., see FIG. 8). In still other implementations, the local hybrid power-data connection interface 706 includes a hybrid plug connector terminating the second end(s) of the optical fiber(s) 713 extending out from the housing 701 to form a hybrid stub cable. The hybrid stub cable also includes a power line extending from the hybrid plug connector, into the housing 701, to the other connection interfaces 702, 704. In an example, the hybrid plug connector is a male connector. In another example, the hybrid plug connector is a female connector.

In the example shown in FIG. 8, the first hybrid power-data connection interface 702 is hybrid plug connector terminating a hybrid stub cable. The second hybrid power-data connection interface 704 and the two local hybrid power-data connection interfaces 706 are hybrid adapter ports disposed at the housing 701. In another example, all of the connection interfaces 702, 704, 706 are defined by hybrid adapter ports disposed at the housing 701. Other examples are possible.

In certain implementations, a power management arrangement 720 is disposed within the housing 701. The power management arrangement 720 electrically connects the power interface 702b of the first hybrid power-data connection interface 702 to the power interface 704b of the second hybrid power-data connection interface 704 and to the power interface 706b of the local hybrid power-data connection interface 706.

For example, a first power conducting line 722 extends between the power interface 702b of the first hybrid power-data connection interface 702 and the power management arrangement 720. A second power conducting line 724 extends between the power interface 704b of the second hybrid power-data connection interface 704 and the power management arrangement 720. One or more local power conducting line(s) 726 extends between the power interface(s) 706b of the local hybrid power-data connection interface(s) 706 and the power management arrangement 720.

In certain implementations, the power management arrangement 720 manages a voltage of the power passing between the hybrid power-data connection interfaces 702, 704, 706 so that power at a first voltage level is delivered to the local hybrid power-data connection interface 706 (via local power conducting line 726) and power at a second voltage level is delivered to the second hybrid power-data connection interface 704 (via second power conducting line 724). In an example, the first voltage level is less than the second voltage level.

In certain implementations, the power management arrangement 720 includes a node controller, such as the node controller 540 of FIG. 5, and a power converter, such as the DC-to-DC converter 550 of FIG. 5.

Figure 9:
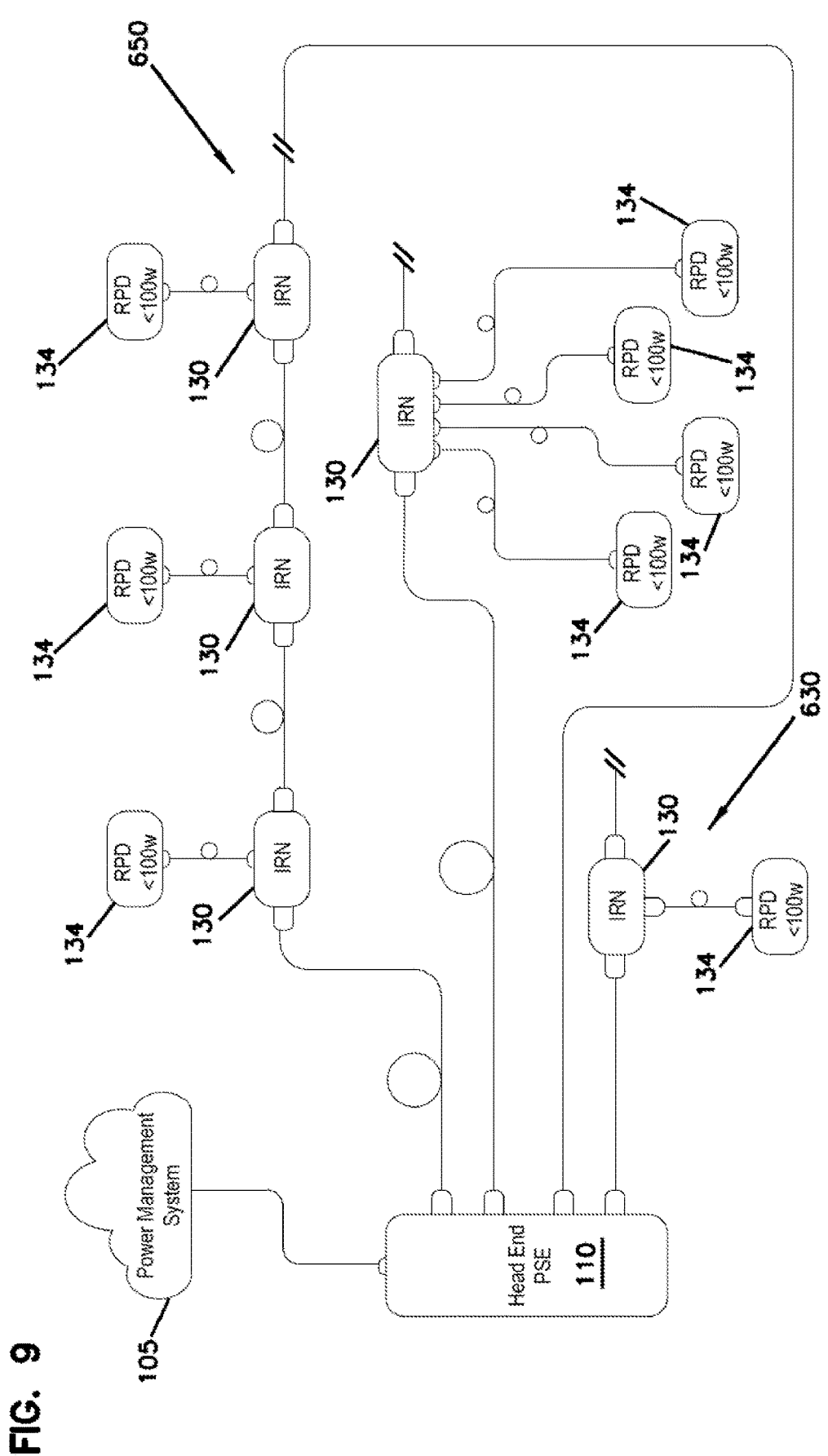
FIG. 9 is a diagram illustrating an example topology for a power distributing fiber access network utilizing bi-directional indexing in accordance with one aspect of the present disclosure.

FIG. 9 is a diagram illustrating an example network topology which may be used in a power distributing fiber access network 100 utilizing bi-directional indexing for connecting intelligent remote distribution nodes 130 with a PSE device 110. A daisy-chain topology, shown at 640, may be used to similarly distribute power from the PSE 110 to each of a plurality of connected remote powered devices 134. In FIG. 9, the final intelligent remote distribution node 130 in the chain also is connected back to the PSE 110 or another PSE 110.

Connecting both ends of the daisy-chain to a PSE 110 enables the PSE 110 to provide power and data signals to the intelligent remote distribution nodes 130 from both ends of the chain. The optical signals are indexed along the chain in a first direction (e.g., from fiber position 1 to fiber position N) as the optical signals travel along the chain from the PSE 110, to the first intelligent remote distribution node 130 in the chain, towards the last intelligent remote distribution node 130 in the chain. The optical signals are indexed along the chain in an opposite second direction (e.g., from fiber position N to fiber position 1) as the optical signals travel along the chain from the PSE 110, to the last intelligent remote distribution node 130 in the chain, towards the first intelligent remote distribution node 130 in the chain.

In some implementations, bi-directional indexing doubles the number of remote devices 134 that can be serviced in the daisy-chain of intelligent remote distribution nodes 130. In other implementations, bi-directional indexing provides a redundant path by which signals and power can be supplied to remote devices 134 if the first path breaks.

Figure 10:
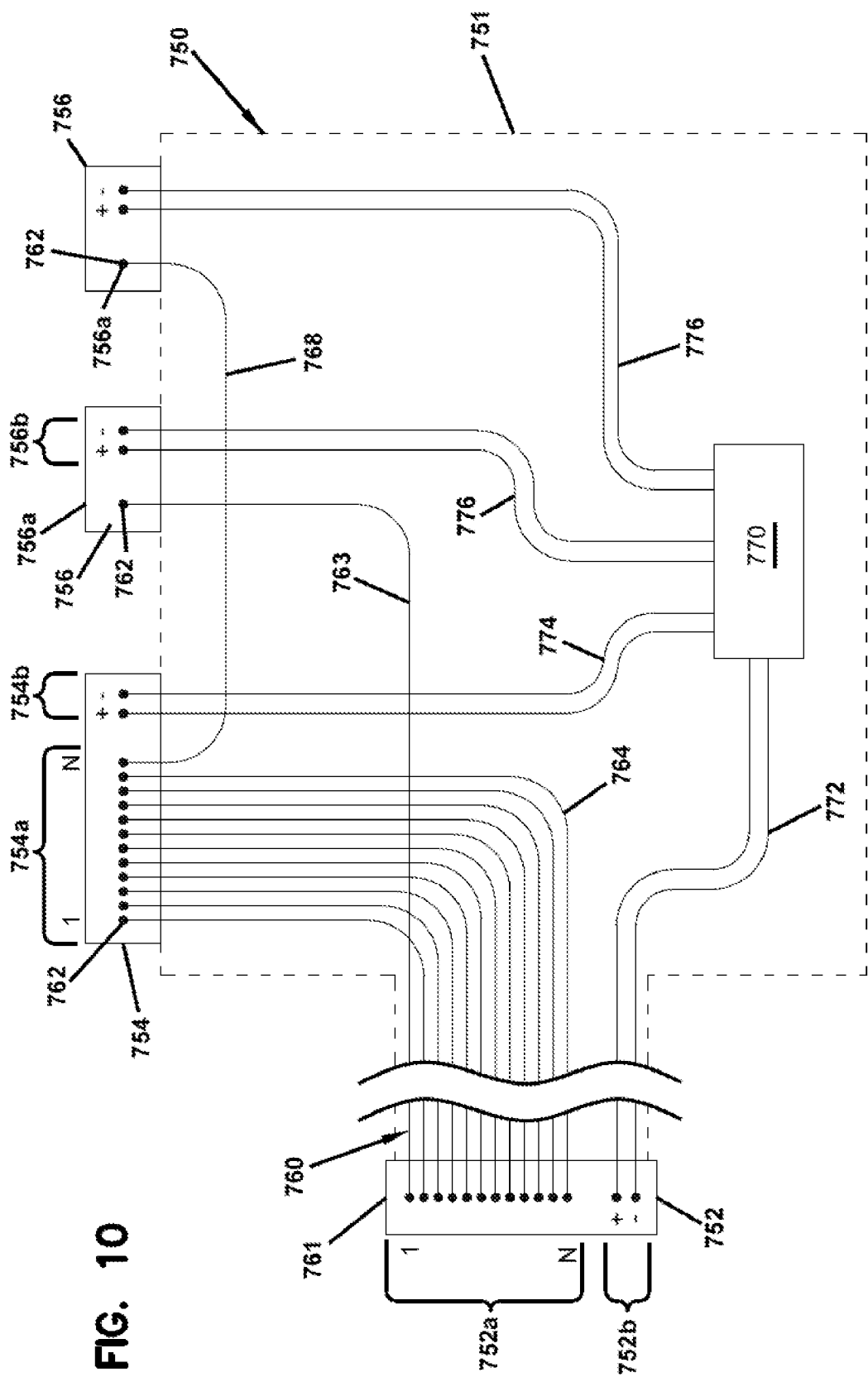
FIGS. 10-12 are schematic diagrams of example intelligent remote distribution nodes suitable for use in the power distributing fiber access network utilizing bi-directional indexing of FIG. 9.

FIG. 10 illustrates an example implementation 750 of an intelligent remote distribution node 130 suitable for use in the bi-directional indexing daisy-chain topology of FIG. 9. The intelligent remote distribution node 750 includes a housing 751, a first hybrid power-data connection interface 752 coupled to the housing 751 and a second hybrid power-data connection interface 754 coupled to the housing 751. Each of the first and second hybrid power-data connection interfaces 752, 754 includes a fiber interface 752*a*, 754*a* and a power interface 752*b*, 754*b*. Each fiber interface 752*a*, 754*a* has a plurality of sequential fiber positions 1 to N.

As noted above, the numerical sequence need not correspond to physical locations of the fiber positions at the connection interfaces 752, 754. The numerical sequence applied to the fiber positions at the first hybrid power-data connection interface 752 also is applied to the fiber positions at the second hybrid power-data connection interface 754. In certain implementations, the numerical sequence assigned to the first and second hybrid power-data connection interfaces 752, 754 of a first intelligent remote distribution node 750 also are applied to the other intelligent remote distribution nodes 750 in the same daisy-chain.

The intelligent remote distribution node 750 also includes a local hybrid power-data connection interface 756 coupled to the housing 751. The local hybrid power-data connection interface 756 includes a fiber interface 756*a* and a power interface 756*b*. The fiber interface 756*a* of the local hybrid power-data connection interface 756 has fewer optical fibers than the fiber interfaces 752*a*, 754*a* of the first and second hybrid power-data connection interfaces 752, 754.

The power interface 752*b* of the first hybrid power-data connection interface 752 is electrically connected to the power interface 754*b* of the second hybrid power-data connection interface 754 and to the power interface 756*b* of the local hybrid power-data connection interface 756.

Multiple optical fibers 760 have first ends 761 disposed at the sequential fiber positions of the fiber interface 752*a* of the first hybrid power-data connection interface 752. The optical fibers 760 extend from the first ends 761 to opposite second ends 762. At least one 763 of the optical fibers 760 is routed within the housing 751 so that the second end 762 is disposed at the fiber interface 756*a* of the local hybrid power-data connection interface 756. The remaining optical fibers 764 (i.e., the optical fibers not routed to a local hybrid power-data connection interface 756) extend to the fiber interface 754*a* of the second hybrid power-data connection interface 754.

The remaining optical fibers 764 are indexed along the sequential fiber positions between the fiber interface 752*a* of the first hybrid power-data connection interface 752 and the fiber interface 754*a* of the second hybrid power-data connection interface 754. As the term is used herein, "indexing" refers to a routing scheme where the optical fibers are routed to the fiber positions in accordance with the numerical sequence starting with the first fiber position in the numerical sequence. Accordingly, the first fiber position of the fiber interface 754*a* of the second hybrid power-data connection interface 754 receives one of the optical fibers 764. It is again noted that the first fiber position in the numerical sequence need not correspond with a left-most or right-most physical location of the fiber interface. The $N^{th}$ fiber position at the fiber interface 754*b* of the second hybrid power-data connection interface 754 does not receive one of the remaining fibers 764.

In certain implementations, the intelligent remote distribution node 750 may include multiple local hybrid power-data connection interfaces 756. In accordance with some aspects of the disclosure, a reverse indexing fiber 768 can be routed between the Nth fiber position at the fiber interface 754*a* of the second hybrid power-data connection interface 754 and the fiber interface 756*a* of another local hybrid power-data connection interfaces 756. Accordingly, optical signals can be supplied to the intelligent remote distribution node 750 through the second hybrid power-data connection interface 754 and fed to a local hybrid power-data connection interface 756.

A first of the local connection interfaces is cabled to a first power and signal source (e.g., a first hybrid port of a PSE 110) along a first path. A second of the local connection interfaces is cabled to a second power and signal source (e.g., a second hybrid port of a PSE 110) along a second path. The second source is different from the first source. In some implementations, bi-directional indexing doubles the number of remote devices 134 that can be serviced in the daisy-chain of intelligent remote distribution nodes 750 (i.e., each intelligent remote distribution nodes 750 can have double the number of local connection interfaces 756 as compared to a single direction indexing schema).

In other implementations, bi-directional indexing provides a redundant path by which signals and power can be supplied to subscribers if the first path breaks. For example, a remote device 134 can be coupled to two local connection interfaces 756 of a given intelligent remote distribution node 750 using a coupler arrangement. In some examples, the coupler connects the remote device 134 to the fiber interfaces 756*a* and the power interfaces 756*b* of the two local connection interfaces 756. In other examples, an optical coupler (e.g., a 1×2 splitter/combiner) optically couples the remote unit 134 to the fiber interfaces 756*a* of the two local connection interfaces 756; a power coupler electrically couples the remote unit 134 to the power interfaces 756*b* of the two local connection interfaces 756.

Accordingly, a provider may initially provide power and signals along the first path to the first local connection interface 756. The remote device 134 receives power and signals from the first local connection interface 756. If the first path breaks (e.g., one of the hybrid cables breaks, one of the intelligent remote distribution nodes 750 breaks, etc.), then a provider can begin providing signals and power along the second path to the second local connection interface 756. Because the remote device 134 is already coupled to the second local connection interface 756 by the coupler arrangement, no modification need to be made to the connections between the remote device 134 and the intelligent remote distribution node 750.

Additional information pertaining to bi-directional indexing can be found in U.S. Pat. No. 9,348,096, the disclosure of which is hereby incorporated above.

In some implementations, the first hybrid power-data connection interface 752 includes a hybrid port defined by or held by the housing 751. For example, a hybrid adapter defining the hybrid port can be held by the housing 751. In other implementations, the first hybrid power-data connection interface 752 includes a plug connector held by the housing 751. In still other implementations, the first hybrid power-data connection interface 752 includes a hybrid plug connector terminating the first ends of the optical fibers 760 extending out from the housing 751 (e.g., see FIG. 10) to form a hybrid stub cable. The hybrid stub cable also includes a power line extending from the hybrid plug connector, into the housing 751, to the other connection interfaces 754, 756. In an example, the hybrid plug connector is a male connector. In another example, the hybrid plug connector is a female connector.

In some implementations, the second hybrid power-data connection interface 754 includes a hybrid port defined by or held by the housing 751. For example, a hybrid adapter defining the hybrid port can be held by the housing 751. In other implementations, the second hybrid power-data connection interface 754 includes a plug connector held by the housing 751 (e.g., see FIG. 10). In still other implementations, the second hybrid power-data connection interface 754 includes a hybrid plug connector terminating the second ends of the optical fibers 764 extending out from the housing 751 to form a hybrid stub cable. The hybrid stub cable also includes a power line extending from the hybrid plug connector, into the housing 751, to the other connection interfaces 752, 756. In an example, the hybrid plug connector is a male connector. In another example, the hybrid plug connector is a female connector.

In some implementations, the local hybrid power-data connection interface 756 includes a hybrid port defined by or held by the housing 751. For example, a hybrid adapter defining the hybrid port can be held by the housing 751. In other implementations, the local hybrid power-data connection interface 756 includes a plug connector held by the housing 751 (e.g., see FIG. 10). In still other implementations, the local hybrid power-data connection interface 756 includes a hybrid plug connector terminating the second end(s) of the optical fiber(s) 763 extending out from the housing 751 to form a hybrid stub cable. The hybrid stub cable also includes a power line extending from the hybrid plug connector, into the housing 751, to the other connection interfaces 752, 754. In an example, the hybrid plug connector is a male connector. In another example, the hybrid plug connector is a female connector.

In the example shown in FIG. 10, the first hybrid power-data connection interface 752 is hybrid plug connector terminating a hybrid stub cable. The second hybrid power-data connection interface 754 and the two local hybrid power-data connection interfaces 756 are hybrid adapter ports disposed at the housing 751. In another example, all of the connection interfaces 752, 754, 756 are defined by hybrid adapter ports disposed at the housing 751. Other examples are possible.

In certain implementations, a power management arrangement 770 is disposed within the housing 751. The power management arrangement 770 electrically connects the power interface 752*b* of the first hybrid power-data connection interface 752 to the power interface 754*b* of the second hybrid power-data connection interface 754 and to the power interface 756*b* of the local hybrid power-data connection interface 756.

For example, a first power conducting line 772 extends between the power interface 752*b* of the first hybrid power-data connection interface 752 and the power management arrangement 770. A second power conducting line 774 extends between the power interface 754*b* of the second hybrid power-data connection interface 754 and the power management arrangement 770. One or more local power conducting line(s) 776 extends between the power interface(s) 756*b* of the local hybrid power-data connection interface(s) 756 and the power management arrangement 770.

In certain implementations, the power management arrangement 770 manages a voltage of the power passing between the hybrid power-data connection interfaces 752, 754, 756 so that power at a first voltage level is delivered to the local hybrid power-data connection interface 756 and power at a second voltage level is delivered to the second hybrid power-data connection interface 754. In an example, the first voltage level is less than the second voltage level.

In certain implementations, the power management arrangement 770 includes a node controller, such as the node controller 540 of FIG. 5, and a power converter, such as the DC-to-DC converter 550 of FIG. 5.

Figure 11:
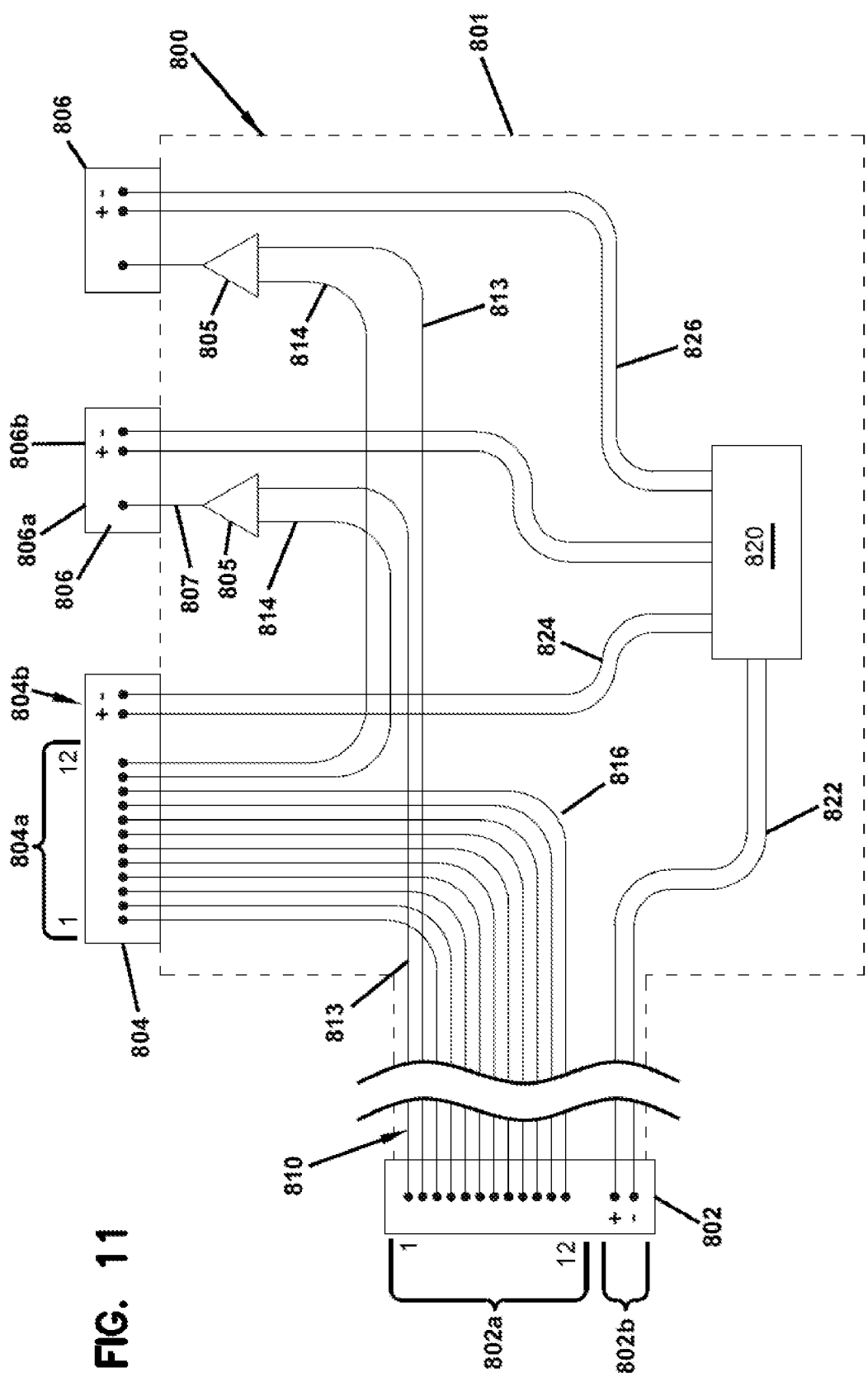
Figure 12:
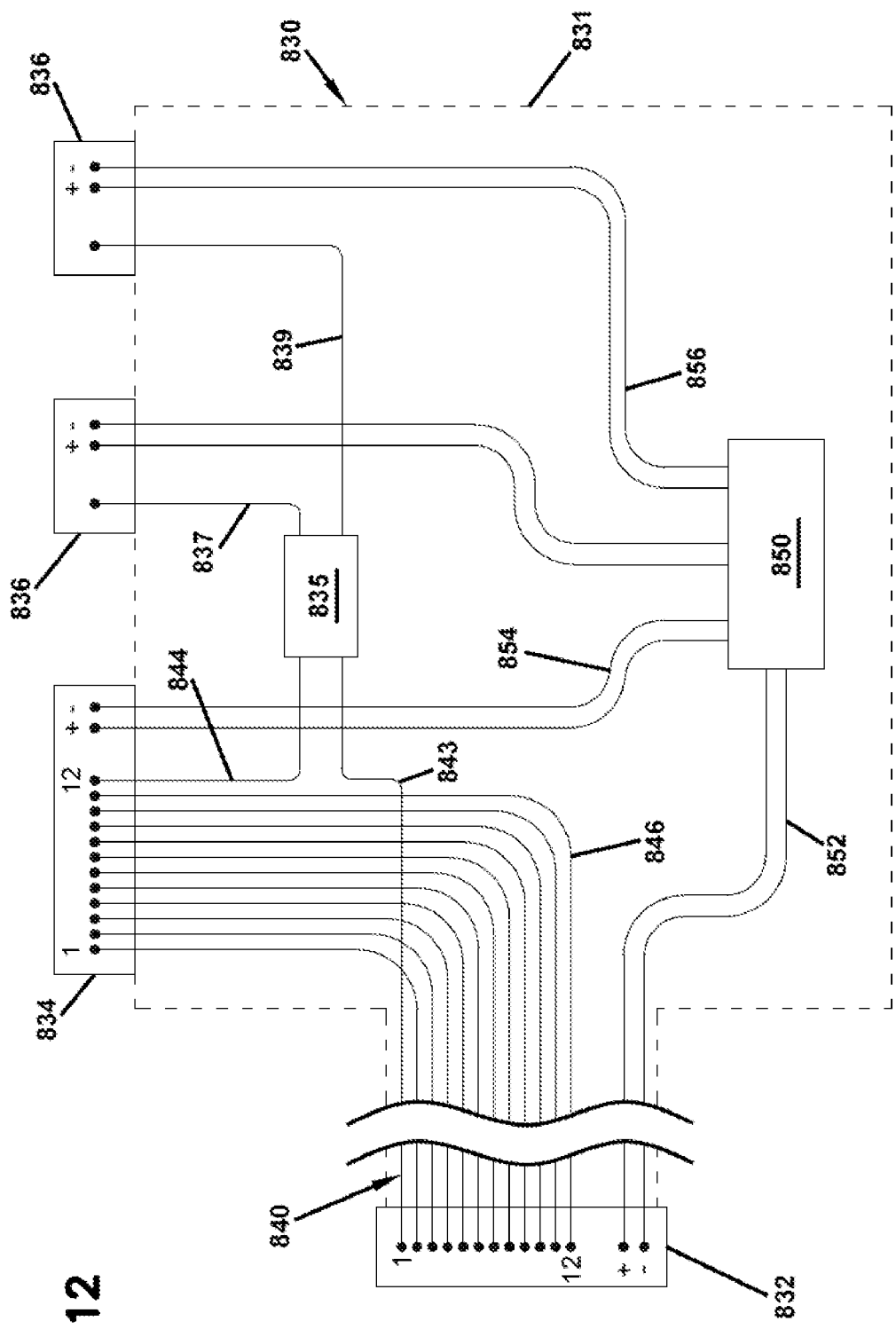

FIGS. 11 and 12 illustrate other example implementations 800, 830 of an intelligent remote distribution node 130 suitable for use in the bi-directional indexing daisy-chain topology of FIG. 9. The intelligent remote distribution node 800, 830 includes a housing 801, 831 a first hybrid power-data connection interface 802, 832 coupled to the housing 801, 831 and a second hybrid power-data connection interface 804, 834 coupled to the housing 801, 831. Each of the first and second hybrid power-data connection interfaces 802, 804, 832, 834 includes a fiber interface 802*a*, 804*a*, 832*a*, 834*a* and a power interface 802*b*, 804*b*, 832*b*, 834*b*. Each fiber interface 802*a*, 804*a*, 832*a*, 834*a* has a plurality of sequential fiber positions 1 to N.

As noted above, the numerical sequence need not correspond to physical locations of the fiber positions at the connection interfaces 802, 804, 832, 834. The numerical sequence applied to the fiber positions at the first hybrid power-data connection interface 802, 832 also is applied to the fiber positions at the second hybrid power-data connection interface 804, 834. In certain implementations, the numerical sequence assigned to the first and second hybrid power-data connection interfaces 802, 804, 832, 834 of a first intelligent remote distribution node 800, 830 also are applied to the other intelligent remote distribution nodes 800, 830 in the same daisy-chain.

The intelligent remote distribution node 800, 830 also includes a local hybrid power-data connection interface 806, 836 coupled to the housing 801, 831. The local hybrid power-data connection interface 806, 836 includes a fiber interface 806*a*, 836*a* and a power interface 806*b*, 836*b*.

The power interface 802*b*, 832*b* of the first hybrid power-data connection interface 802, 832 is electrically connected to the power interface 804*b*, 834*b* of the second hybrid power-data connection interface 804, 834 and to the power interface 806*b*, 836*b* of the local hybrid power-data connection interface 806, 836 of the intelligent remote distribution node 800, 830, respectively.

In certain implementations, a power management arrangement 820, 850 is disposed within the housing 800, 830. The power management arrangement 820, 850 electrically connects the power interface 802*b*, 832*b* of the first hybrid power-data connection interface 802, 832 to the power interface 804b, 834b of the second hybrid power-data connection interface 804, 834 and to the power interface 806b, 836b of the local hybrid power-data connection interface 806, 836.

For example, a first power conducting line 822, 852 extends between the power interface 802b, 832b of the first hybrid power-data connection interface 802, 832 and the power management arrangement 770. A second power conducting line 774 extends between the power interface 804b, 834b of the second hybrid power-data connection interface 804, 834 and the power management arrangement 820, 850. One or more local power conducting line(s) 826, 856 extends between the power interface(s) 806b, 836b of the local hybrid power-data connection interface(s) 806, 836 and the power management arrangement 820, 850.

In certain implementations, the power management arrangement 820, 850 manages a voltage of the power passing between the hybrid power-data connection interfaces 802, 804, 806, 832, 834, 836 so that power at a first voltage level is delivered to the local hybrid power-data connection interface 806, 836 and power at a second voltage level is delivered to the second hybrid power-data connection interface 804, 834. In an example, the first voltage level is less than the second voltage level.

In certain implementations, the power management arrangement 820, 850 includes a node controller, such as the node controller 540 of FIG. 5, and a power converter, such as the DC-to-DC converter 550 of FIG. 5.

The fiber interface 806a, 836a of the local hybrid power-data connection interface 806, 836 has fewer optical fibers than the fiber interfaces 802a, 804a, 832a, 834b of the first and second hybrid power-data connection interfaces 802, 804, 832, 834. In the example shown, the fiber interface 806a, 836a of each local connection interface 806, 836 is optically coupled to both the fiber dropped in the first indexing direction and the fiber dropped in the second indexing direction. For example, each local connection interface 806, 836 can be optically coupled to a first optical fiber having a first end at the first position of the fiber interface 802a, 832a at the first hybrid power-data connection interface 802, 832 and each local connection interface 806, 836 can be optically coupled to another optical fiber having a second end at the $N^{th}$ position of the fiber interface 804a, 834a at the second hybrid power-data connection interface 804, 834.

In FIGS. 11 and 12, the fiber interface 806a, 836a of a local connection interface 806, 836 receives an output 807, 837, 839 of an optical coupler 805, 835 (e.g., a 2×1 optical power splitter, a D×D optical power splitter where D is any integer, etc.). A first input of the optical coupler 805, 835 is taken from a dropped fiber 813, 843 from the first hybrid power-data connection interface 802, 832; a second input of the optical coupler 805, 835 is taken from a dropped fiber 814, 844 from the second hybrid power-data connection interface 804, 834. Accordingly, the fiber interface 806a, 836a of a local connection interface 806, 836 is cabled to receive optical signals being indexed up and down the network.

In some examples, each local connection interface 806 is associated with a respective optical coupler 805 (e.g., see FIG. 11). In an example, each fiber dropped in a given indexing direction goes to a unique local connection interface 806. In other examples, the same optical coupler 835 services multiple local connection interfaces 836 (e.g., see FIG. 12). In an example, dropped fibers in both indexing directions are input into the optical coupler 835 and multiple local connection interfaces 836 are coupled to the outputs of the optical coupler 835.

The remaining optical fibers 816, 846 are indexed along the sequential fiber positions between the fiber interface 802a, 832a of the first hybrid power-data connection interface 802, 832 and the fiber interface 804a, 834a of the second hybrid power-data connection interface 804, 834. Accordingly, the first fiber position of the fiber interface 804a, 834a of the second hybrid power-data connection interface 804, 834 receives one of the optical fibers 816, 846. It is again noted that the first fiber position in the numerical sequence need not correspond with a left-most or right-most physical location of the fiber interface. The $N^{th}$ fiber position at the fiber interface 804a, 834a of the second hybrid power-data connection interface 804, 834 does not receive one of the remaining fibers 816, 846.

In accordance with some aspects of the disclosure, the power management arrangement (or portions thereof) may not be needed at each intelligent remote distribution nodes or at all local connection interfaces at an intelligent remote distribution node. In such cases, the intelligent remote distribution nodes can be implemented in two-part form. A first part manages the fiber drops and fiber indexing amongst the first, second, and local connection interfaces as described above. In certain examples, the first part also performs basic power management (e.g., using a gated pass-through power bus) without managing voltage levels at the local connection interfaces.

If power is not needed (or if power is needed, but voltage management is not needed) at any of the local connection interfaces, then only the first part of the intelligent remote distribution node is used at that drop point in the network. However, if power (or voltage management) is needed, then a second part can be added to the first part. The second part holds the voltage management circuitry (e.g., a DC-to-DC converter).

FIGS. 13-16 illustrate four example implementations of the second part that can be utilized with an example first part 860. In the examples shown in FIGS. 13-16, the first and second hybrid connection interfaces 862, 864 of the first part 860 each define twelve fiber positions. It is noted that a greater or lesser number of fiber positions (e.g., 2, 3, 4, 8, 24, 48, 96, 144) are possible. A power line 870 extends between the first and second hybrid connection interfaces 862, 864 (e.g., along a gated pass-through power bus). Power can be supplied from the power line to one or more of the local connection interfaces 866.

In some implementations, one or more of the dropped optical fibers 871 extends from the first hybrid connection interface 862 to a respective one of the local connection interfaces 866. Accordingly, the local connection interface 866 receives a full power signal from the first hybrid connection interface 862. In other implementations, one or more of the dropped optical fibers 872 is input to an optical power splitter 875 (or wave division multiplexer). Outputs 873 of the power splitter 875 are directed to two or more of the local connection interfaces 866.

In some implementations, one or more of the local connection interfaces 866 are hybrid connection interfaces receiving both data signals and power. In other implementations, one or more of the local connection interfaces 866 can receive data signals only. For example, in FIG. 13, a first local connection interface 866a receives only a fiber line (e.g., an output 873 of the optical splitter 875) without receiving power; a second local connection interface 866b receives both power and data (e.g., via an output 873 of the optical splitter 875); and a third local connection interface 866c receives both power and data (e.g., via an unsplit fiber 871).

The second part 900, 920, 930, 940 can be connected to any hybrid local connection interface 866 (i.e., a local connection interface receiving both data and power). The second part has an input connection interface 901 and at least one output connection interface 902. Power received at the input connection interface 901 is directed to a power management arrangement 910. In certain examples, the power management arrangement 910 includes a converter (e.g., a DC-to-DC converter). The power management arrangement 910 manages a voltage supplied to the output connection interface(s) 902.

Figure 13:
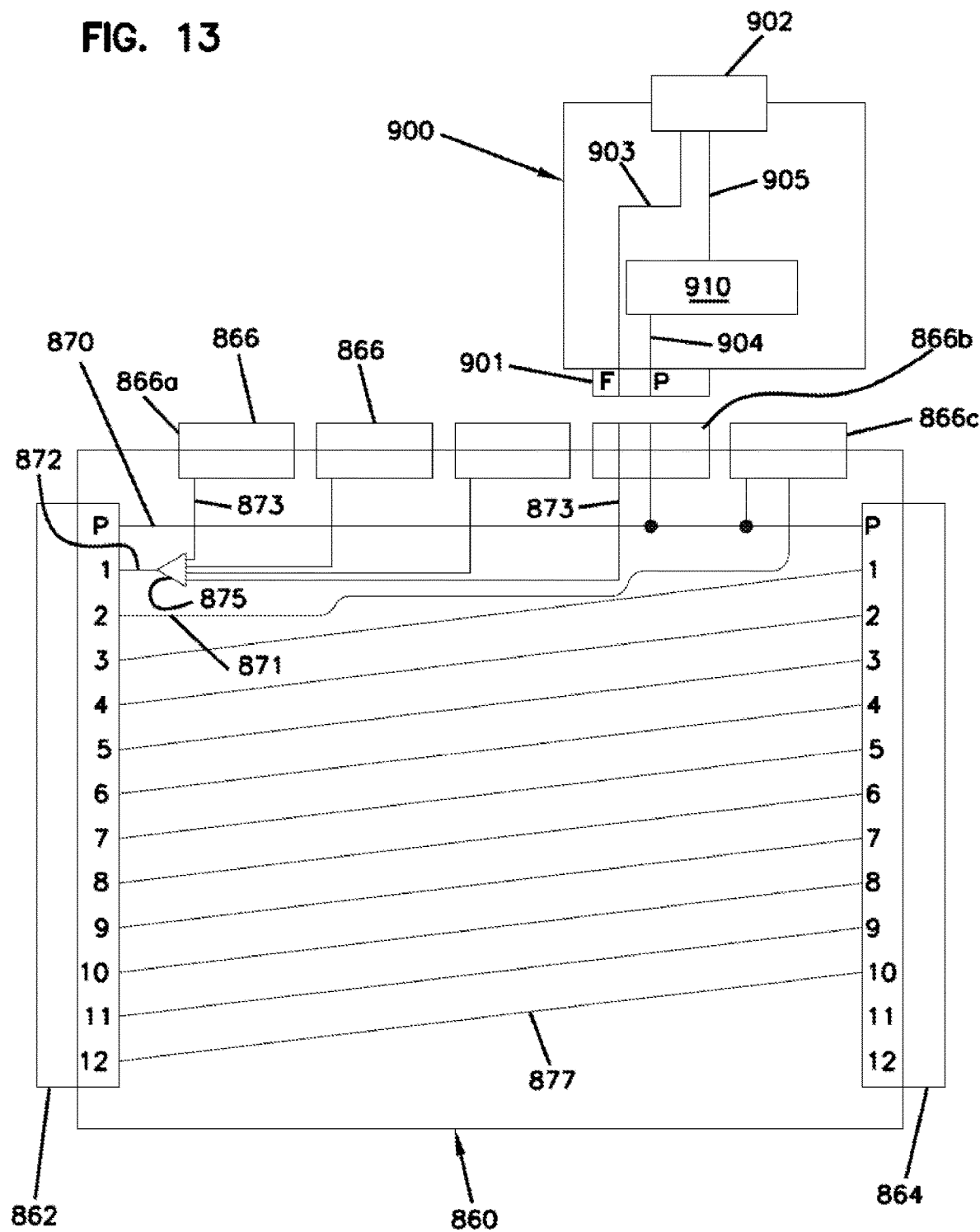
FIGS. 13-16 are schematic diagrams of example two-part intelligent remote distribution nodes where the indexing occurs in a first part and at least some of the power management circuitry is disposed in an optional second part.

A first example second part 900 is shown in FIG. 13. In the example shown, the data received at the input connection interface 901 is directed along an optical fiber 903 to the output connection interface 902. Accordingly, the data signals carried by the optical fiber 903 are not split between the input connection interface 901 and the output connection interface 902.

Figure 14:
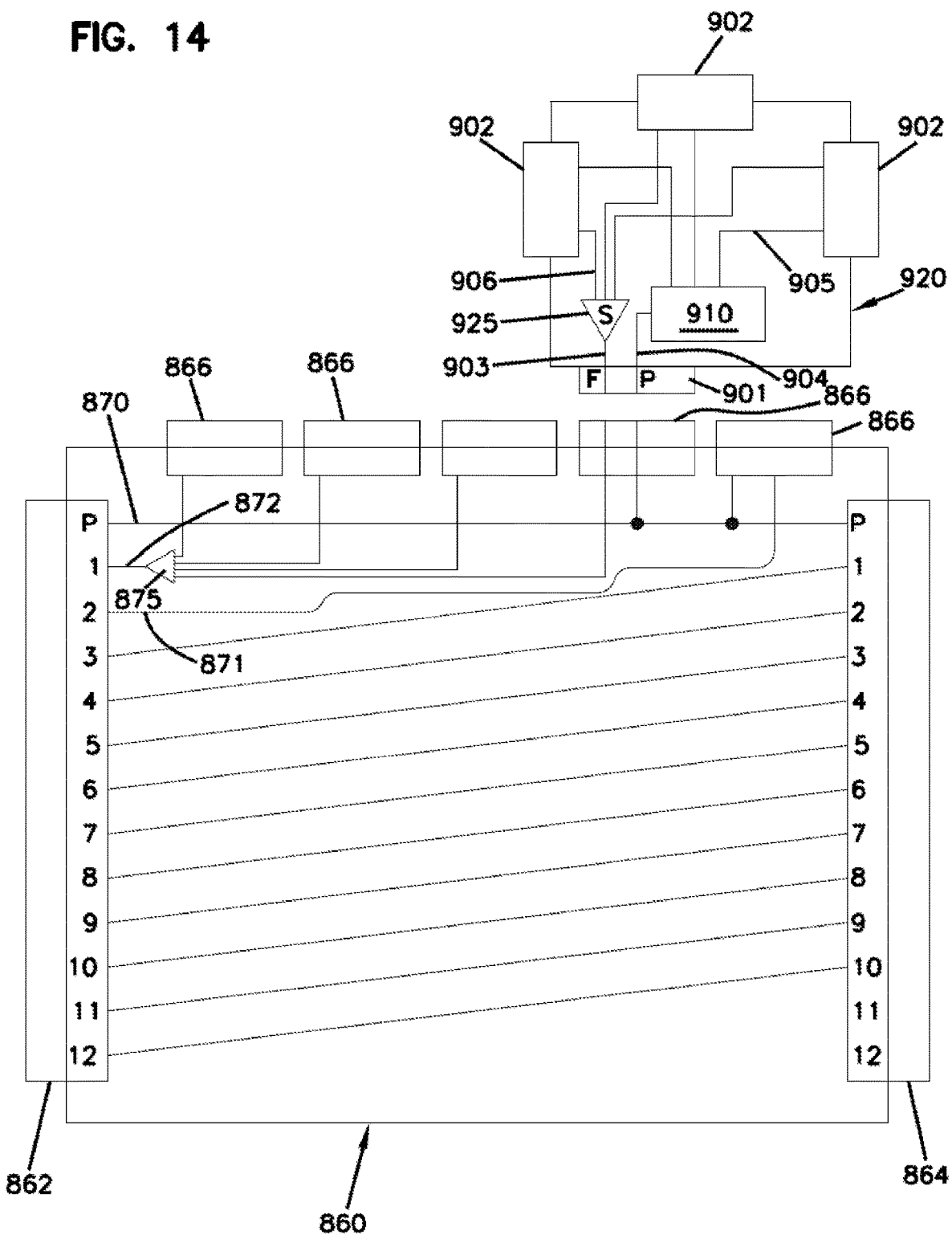

A second example second part 920 is shown in FIG. 14. The second example second part 920 has multiple output connection interfaces 902. Power received at the input connection interface 901 is distributed to each of the output connection interfaces 902 (e.g., via power management arrangement 910). In the example shown, the data received at the input connection interface 901 is directed along an optical fiber 903 to an input of an optical power splitter 925. The optical power splitter 925 has a 1×N split ratio, where N is equal to the number of splitter outputs 906. In various examples, N can be 2, 4, 6, 8, 12, 16, 24, 36, 64, 96, 144, etc. The optical power splitter 925 splits any optical signals carried by the optical fiber 903 onto the splitter outputs 906. The splitter outputs 906 are routed to the output connection interfaces 902. In certain implementations, N is equal to the number of output connection interfaces 902. Accordingly, each output connection interface 902 receives a data signal having split optical power.

Figure 15:
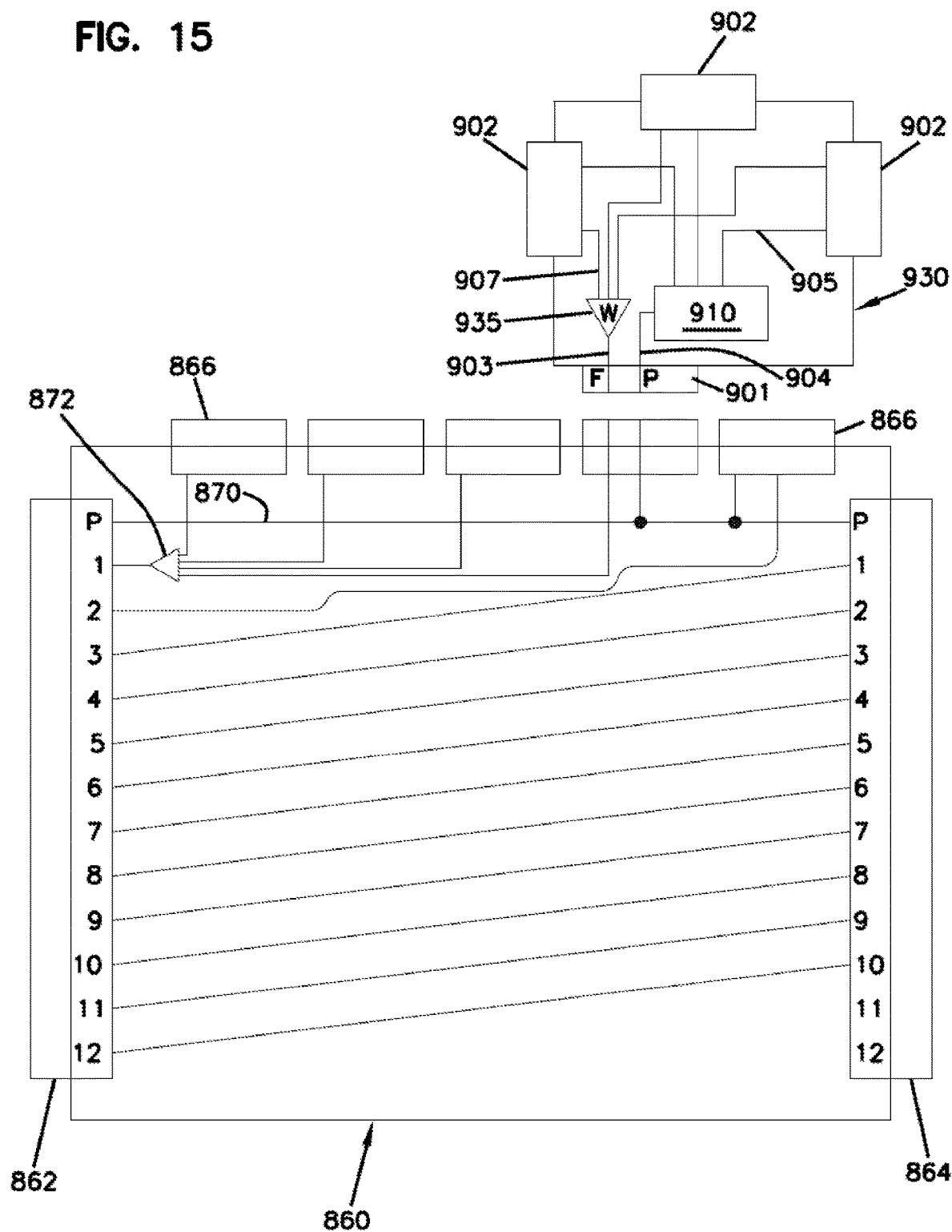

A third example second part 930 is shown in FIG. 15. The third example second part 930 has multiple output connection interfaces 902. Power received at the input connection interface 901 is distributed to each of the output connection interfaces 902 (e.g., via power management arrangement 910). In the example shown, the data received at the input connection interface 901 is directed along an optical fiber 903 to an input of a wave division multiplexer 935 (e.g., a DWDM, a CWDM, etc.). The wave division multiplexer 935 divides the data signal into separate wavelengths or wavelength bands. Each wavelength or wavelength band is carried by a separate output 907 of the wave division multiplexer 935. The outputs 907 are routed to the output connection interfaces 902. Accordingly, each output connection interface 902 receives a data signal having only a portion of the wavelengths of the original signal.

Figure 16:
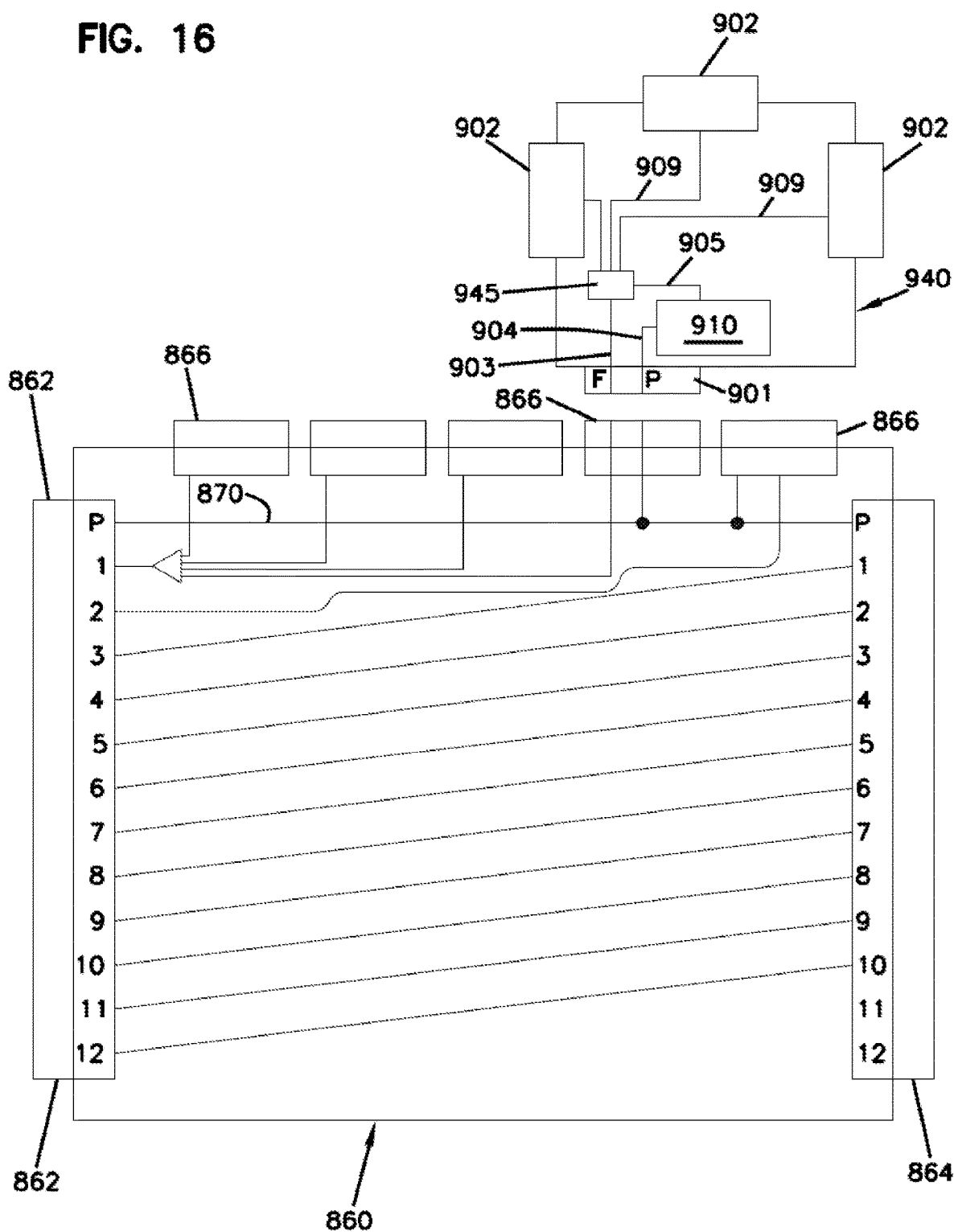

A fourth example second part 940 is shown in FIG. 16. The fourth example second part 940 can have one or more output connection interfaces 902. In the example shown, the data received at the input connection interface 901 is directed along an optical fiber 903 to an optical/electrical converter 945. The optical/electrical converter 945 converts the optical data signals to electrical signals. Outputs 909 (e.g., twisted pair cables) of the optical/electrical converter 945 are routed to the output connection interfaces 902. Accordingly, each output connection interface 902 receives an electrical data signal.

Power received at the input connection interface 901 is directed to a power management arrangement 910. In some implementations, the power is outputted from the power management arrangement 910 to the optical/electrical converter 945. The optical/electrical converter 945 combines the power with the electrical data signal onto the outputs to form a Power-over-Ethernet signal. In other implementations, the optical/electrical converter 945 and the outputs the electrical data signals to the power management arrangement 945, which outputs conductive wires to the output connection interface(s) 902.

In the examples of the second part shown in FIGS. 13-16, the second part 900, 920, 930, 940 is shown aligned with the local connection interface 866 receiving a split data signal and power. In other examples, however, the second part 900, 920, 930, 940 can interface with a local connection interface 866 receiving an unsplit data signal and power. In certain implementations, the second part 900, 920, 930, 940 is not used with local connection interfaces 866 that do not receive power.

In the examples shown in FIGS. 13-16, the fibers of the first part 860 are dropped in only a first indexing direction (e.g., the last fiber positions of the second hybrid connection interface 864 are empty). In other examples, however, the first part 860 can be cabled as discussed above with respect to FIGS. 9-12 to support bi-directional indexing. Any of the second parts 900, 920, 930, 940 discussed above can be utilized with local connection interface(s) 866 of a first part 860 supporting bi-directional indexing. For example, any of the optical couplers shown in FIGS. 11 and 12 can be utilized in a bi-directional indexing schema of the first part 860.

EXAMPLE EMBODIMENTS

Example 1 includes a network interface device, the network interface device comprising: a first hybrid power-data port; a second hybrid power-data port; a managed gated pass-through power bus coupled between the first hybrid power-data port and the second hybrid power-data port; and a node controller powered from at least one of the first hybrid power-data port or the second hybrid power-data port, wherein power flow though the managed gated pass-through power bus is controlled by the node controller.

Example 2 includes the network interface device of example 1, wherein the first hybrid power-data port and the second hybrid power-data port are configured to couple with a hybrid power-data cable comprising at least one pair of electrical conductors to transport electric power, and a plurality of optical fibres to transport data communications.

Example 3 includes the network interface device of any of examples 1-2, wherein the first hybrid power-data port and the second hybrid power-data port are configured to couple with a hybrid power-data cable comprising at least one pair of electrical conductors to transport electric power, and a plurality of electrical conductors to transport data communications.

Example 4 includes the network interface device of any of examples 1-3, further comprising: a local power bus coupled to at least a first local port, wherein the local power bus operates at a different voltage than the managed gated pass-through power bus, wherein the first local port is configured to deliver electric power and a data connectivity to a remote powered device coupled to the first local port; and a DC-to-DC converter, wherein power flow from the pass-through power bus to the local power bus is controlled by the DC-to-DC converter.

Example 5 includes the network interface device of example 4, wherein the DC-to-DC converter is coupled to a managed gated pass-through power bus by a cable.

Example 6 includes the network interface device of any of examples 4-5, wherein the DC-to-DC converter is coupled to a managed gated pass-through power bus via a third hybrid power-data port that branches from the a managed gated pass-through power bus.

Example 7 includes the network interface device of any of examples 4-6, wherein the first local port comprises a Power-over-Ethernet IEEE 802.3x standard compliant port.

Example 8 includes the network interface device of any of examples 4-7, wherein the local power bus operates at a lower voltage than the managed gated pass-through power bus.

Example 9 includes the network interface device of example 8, wherein the local power bus operates at an ES1 class voltage level and the pass-through power bus operates at an ES2 class voltage level.

Example 10 includes the network interface device of any of examples 4-9, further comprising: an internal or external local energy storage and management device that includes at least one energy storage device configured to provide power to the local power bus.

Example 11 includes the network interface device of example 10, further comprising: at least one renewable energy device configured to provide power to the local power bus.

Example 12 includes the network interface device of any of examples 10-11, wherein the DC-to-DC converter comprises a bi-directional DC-to-DC converter; wherein the node controller is configured to control the bi-directional DC-to-DC converter to direct power flow from the internal local energy storage and management device to the pass through power bus.

Example 13 includes the network interface device of any of examples 1-12, further comprising: a first port controller coupled to the first hybrid power-data port, wherein the first port controller is configured to harvest energy from a polling signal received over the first hybrid power-data port.

Example 14 includes the network interface device of example 13, wherein the first port controller is configured to transmit a response to the polling signal, wherein the response to the polling signal includes power classification information regarding the network interface device.

Example 15 includes the network interface device of any of examples 13-14, wherein the polling signal comprises one or more of a low frequency AC polling signal, an on-off keying polling signal, an amplitude modulation polling signal, a phase-shift keying (psk) polling signal, a frequency-shift keying (fsk) polling signal, or a dual-tone multi-frequency polling signal.

Example 16 includes the network interface device of any of examples 1-15, further comprising: a third hybrid power-data port coupled to the managed gated pass-through power bus; wherein the node controller controls power flow through the third hybrid power-data port by controlling the managed gated pass-through power bus.

Example 17 includes the network interface device of any of examples 1-16, further comprising: a disconnect mechanism coupled to first port controller and the first hybrid power-data port, wherein the disconnect mechanism includes a mechanical interlock that secures a hybrid power-data cable to the hybrid power-data port; wherein when the disconnect mechanism is actuated, the disconnect mechanism sends a signal to the node controller to curtail current demand through the first hybrid power-data port before the mechanical interlock releases the hybrid power-data cable.

Example 18 includes the network interface device of any of examples 1-17, wherein the node controller is configured to switch a direction of power flow through the managed gated pass-through power bus between the first hybrid power-data port and the second hybrid power-data port.

Example 19 includes a network interface device comprising: a housing; a first hybrid power-data connection interface coupled to the housing, the first hybrid power-data connection interface including a fiber interface and a power interface, the fiber interface having a plurality of sequential fiber positions; a second hybrid power-data connection interface coupled to the housing, the second hybrid power-data connection interface including a fiber interface and a power interface, the fiber interface of the second hybrid power-data connection interface having a plurality of sequential fiber positions; a local hybrid power-data connection interface coupled to the housing, the local hybrid power-data connection interface including a fiber interface and a power interface, the fiber interface of the local hybrid power-data connection interface having fewer optical fibers than the fiber interface of the first and second hybrid power-data connection interfaces; the power interface of the first hybrid power-data connection interface being electrically connected to the power interface of the second hybrid power-data connection interface and to the power interface of the local hybrid power-data connection interface; a plurality of optical fibers having first ends disposed at the sequential fiber positions of the fiber interface of the first hybrid power-data connection interface, the plurality of optical fibers including a first optical fiber extending to the fiber interface of the local hybrid power-data connection interface; and a remainder of the plurality of optical fibers extending to the fiber interface of the second hybrid power-data connection interface, the remainder of the plurality of optical fibers being indexed along the sequential fiber positions between the fiber interface of the first hybrid power-data connection interface and the fiber interface of the second hybrid power-data connection interface.

Example 20 includes the network interface device of example 19, wherein the first hybrid power-data connection interface includes a hybrid port held by the housing.

Example 21 includes the network interface device of any of examples 19-20, wherein the first hybrid power-data connection interface includes a plug connector held by the housing.

Example 22 includes the network interface device of any of examples 19-21, wherein the first hybrid power-data connection interface includes a plug connector terminating a stub hybrid cable extending out from the housing, the plug connector being disposed external of the housing.

Example 23 includes the network interface device of any of examples 19-22, further comprising a node controller disposed within the housing, the node controller electrically connecting the power interface of the first hybrid power-data connection interface to the power interface of the second hybrid power-data connection interface and to the power interface of the local hybrid power-data connection interface.

Example 24 includes the network interface device of example 23, further comprising a power converter disposed within the housing, the power converter being configured to manages a voltage of the power passing between the hybrid power-data connection interfaces so that power at a first voltage level is delivered to the local hybrid power-data connection interface and power at a second voltage level is delivered to the second hybrid power-data connection interface, wherein the first voltage level is less than the second voltage level.

Example 25 includes the network interface device of any of examples 19-24, wherein the fiber interface of the local hybrid power-data connection interface includes only a single optical fiber position.

Example 26 includes the network interface device of any of examples 19-25, wherein the a local hybrid power-data connection interface is a first local hybrid power-data connection interface; and further comprising a second local hybrid power-data connection interface.

Example 27 includes the network interface device of example 26, further comprising a reverse indexing fiber extending between the second local hybrid power-data connection interface and a last sequential fiber position at the second hybrid power-data connection interface.

Example 28 includes a network device, the network device comprising: a hybrid power-data port configured to couple to a hybrid power-data cable; a first port controller; and a disconnect mechanism coupled to first port controller, wherein the disconnect mechanism includes a mechanical interlock that secures the hybrid power-data cable to the hybrid power-data port, wherein when the disconnect mechanism is actuated, the disconnect mechanism sends a signal to the first port controller, wherein the first port controller curtails a current flow through the hybrid power-data port in response to the signal before the mechanical interlock releases the hybrid power-data cable.

Example 29 includes he network device of example 28, wherein the first port controller is configured to harvest energy from a polling signal received over the hybrid power-data port.

Example 30 includes the network device of any of examples 28-29, wherein the first port controller is further configured to transmit a response to the polling signal, wherein the response to the polling signal includes power classification information regarding the network device.

A network interface device comprising: a housing defining an interior; a first hybrid power-data connection interface carried by the housing, the first hybrid power-data connection interface including a first fiber interface and a first power interface, the first fiber interface defining sequential fiber positions; a second hybrid power-data connection interface carried by the housing, the second hybrid power-data connection interface including a second fiber interface and a second power interface, the second fiber interface defining sequential fiber positions, the second fiber interface having a common number of sequential fiber positions with the first fiber interface; a local port including a local fiber interface and a local power interface; a plurality of optical fibers having first ends disposed at the sequential fiber positions of the first fiber interface of the first hybrid power-data connection interface, the plurality of optical fibers including a first optical fiber having an opposite second end disposed at the fiber interface of the local hybrid power-data connection interface; and a remainder of the plurality of optical fibers having second ends routed to the second fiber interface of the second hybrid power-data connection interface, the remainder of the plurality of optical fibers being indexed between the first fiber interface and the second fiber interface; a gated pass-through power bus coupled between a first hybrid power-data connection interface and a second hybrid power-data connection interface; a node controller powered from at least one of a first hybrid power-data connection interface and a second hybrid power-data connection interface, wherein power flow through the gated pass-through power bus is controlled by the node controller; and a local power bus coupled to at least the local port, wherein the local power bus operates at a different voltage than the gated pass-through power bus, wherein the first local port is configured to deliver electric power and a data connectivity to a remote powered device coupled to the local port.

Example 32 includes the network interface device of example 31, further comprising a DC-to-DC converter, wherein power flow from the pass-through power bus to the local power bus is controlled by the DC-to-DC converter.

Example 33 includes the network interface device of any of examples 31-32, wherein the first hybrid power-data connection interface includes a hybrid adapter port.

Example 34 includes the network interface device of example 33, wherein the hybrid adapter port is disposed at a wall of the housing.

Example 35 includes the network interface device of any of examples 31-34, wherein the first hybrid power-data connection interface includes a hybrid plug connector.

Example 36 includes the network interface device of example 35, wherein the first and second optical fibers extend from an interior of the housing to the hybrid plug connector external of and spaced from the housing.

Example 37 includes the network interface device of any of examples 31-36, wherein the hybrid plug connector is a ruggedized plug connector including a twist-to-lock fastener and including part of an environmental sealing mechanism.

Example 38 includes the network interface device of example 37, wherein the part of the environmental sealing mechanism includes a gasket.

Example 39 includes the network interface device of any of examples 31-38, wherein the second hybrid power-data connection interface includes a hybrid adapter port.

Example 40 includes the network interface device of example 39 wherein the hybrid adapter port is disposed at a wall of the housing.

Example 41 includes the network interface device of any of examples 31-40, wherein the second hybrid power-data connection interface includes a hybrid plug connector.

Example 42 includes the network interface device of example 41, wherein the first and second optical fibers extend from an interior of the housing to the hybrid plug connector external of and spaced from the housing.

Example 43 includes the network interface device of any of examples 41-42, wherein the hybrid plug connector is a ruggedized plug connector including a twist-to-lock fastener and including part of an environmental sealing mechanism.

Example 44 includes the network interface device of example 43, wherein the part of the environmental sealing mechanism includes a gasket.

Example 45 includes the network interface device of any of examples 31-45, wherein the local port is a first of a plurality of local ports.

Example 46 includes the network interface device of example 45, wherein the first optical fiber is one of a plurality of dropped fibers, each dropped fiber extending between one of the local ports and one of the sequential fiber positions at the first fiber interface of the first hybrid power-data connection interface.

Example 47 includes the network interface device of any of examples 45-46, further comprising a bi-directional indexing optical fiber extending between a second of the local ports and a non-first sequential fiber position at the first fiber interface of the second hybrid power-data connection interface.

Example 48 includes the network interface device of example 47, wherein the non-first sequential fiber position is a last sequential fiber position at the first fiber interface of the second hybrid power-data connection interface.

Example 49 includes a power distribution access network, the network comprising: a power sourcing equipment device having at least one hybrid power-data port; at least one remote distribution node coupled to the power sourcing equipment device by a hybrid power-data cable; at least one remote powered device coupled to the at least one remote distribution node; and a power management system coupled to the power sourcing equipment device; wherein the at least one hybrid power-data port is configured to deliver power at a first voltage level to the at least one remote distribution node over at least one pair of electrical conductors of the hybrid power-data cable; wherein the at least one remote distribution node is configured to deliver power, at a second voltage level different than the first voltage level, to the at least one remote powered device; and wherein the power management system enables delivery of power at the first voltage level to the at least one remote distribution node based on power class information received from the at least one remote distribution node via the power sourcing equipment device.

Example 50 includes the network of example 49, wherein the first voltage level is a higher voltage than the second voltage level.

Example 51 includes the network of example 50, wherein the first voltage level is an ES2 class voltage level and the second voltage level is an ES1 class voltage level, and wherein the at least one hybrid power-data port comprises a PS3 class power source.

Example 52 includes the network of any of examples 49-51, wherein the at least one remote distribution node is indirectly coupled to the at least one hybrid power-data port via at least one intervening remote distribution node.

Example 53 includes the network of example 52, wherein the at least one remote distribution node and the at least one intervening remote distribution node form part of a closed ring topology, where each end of the closed ring topology is coupled to different hybrid power-data ports of the power sourcing equipment device.

Example 54 includes the network of any of examples 49-53, wherein the at least one remote distribution node includes a remote distribution auxiliary node.

Example 55 includes the network of any of examples 49-54, wherein the at least one remote distribution node comprise an internal or external energy storage device, wherein the at least one remote distribution node is configured to selectively provide power at the first voltage level to at least one other remote distribution node when power from the at least one hybrid power-data port is interrupted.

Example 56 includes the network of any of examples 49-55, wherein at least one hybrid power-data port comprises a disconnect mechanism, wherein the disconnect mechanism includes a mechanical interlock that secures the hybrid power-data cable to the at least one hybrid power-data port, wherein when the disconnect mechanism is actuated, the power sourcing equipment device curtails current flow through the at least one hybrid power-data port before the mechanical interlock releases the hybrid power-data cable.

Example 57 includes the network of example 56, wherein the power sourcing equipment device is configured to detect disconnection of the hybrid power-data cable, and wherein the power sourcing equipment device is configured to curtail voltage at the at least one hybrid power-data port when disconnection of the hybrid power-data cable is detected.

Example 58 includes the network of any of examples 49-57, wherein prior to delivering power at the first voltage level to the at least one remote distribution node, the power sourcing equipment device transmits a polling signal from the at least one hybrid power-data port; and wherein the at least one remote distribution node is configured to transmit a response to the polling signal that includes the power class information received by the power management system.

Example 59 includes the network of any of examples 49-58, wherein the at least one remote distribution node comprises a plurality of remote distribution nodes, wherein the power sourcing equipment device and the plurality of remote distribution nodes are arranged in a point-to-multipoint power distribution structure.

Example 60 includes the network of any of examples 49-59, wherein the hybrid power-data cable comprises: at least one pair of electrical conductors to deliver electric power; and at least one optical fiber to transport data communications.

Example 61 includes the network of any of examples 49-60, wherein the hybrid power-data cable comprises: at least one pair of electrical conductors to deliver electric power; and a plurality of electrical conductors to transport data communications.

Example 62 includes a power distribution access network comprising: a power sourcing equipment device having at least one hybrid power-data port; and a plurality of remote distribution nodes daisy-chained together by a plurality of hybrid power-data cables so that a power line and a plurality of optical lines pass along the remote distribution nodes, wherein the optical lines sequentially drop off along the chain, wherein a remainder of the optical lines are indexed at each remote distribution node, wherein a first of the remote distribution nodes is coupled to the power sourcing equipment device.

Example 63 includes the power distribution access network of example 62, further comprising at least one remote powered device coupled to the at least one of the remote distribution nodes by a hybrid cable, the at least one remote powered device receiving power and optical signals from the at least one of the remote distribution nodes.

Example 64 includes the power distribution access network of any of examples 62-63, wherein a last of the remote distribution nodes in the daisy-chain is coupled to the power sourcing equipment device.

Example 65 includes the power distribution access network of example 64, wherein each remote distribution node includes a first local connection interface and a second local connection interface, wherein the first local connection interface receives optical signals carried in a first indexing direction from the first remote distribution node; and wherein the second local connection interface receives optical signals carried in a second indexing direction from the last remote distribution node.

Example 66 includes the power distribution access network of example 65, further comprising a plurality of remote powered devices, each remote powered device being optically and electrically coupled to a respective one of the local connection interfaces.

Example 67 includes the power distribution access network of any of examples 65-66, further comprising an optical coupler disposed within each remote distribution node, the optical coupler receiving optical signals carried in both the first indexing direction and the second indexing direction, the optical coupler combining the optical signals onto at least one output.

Example 68 includes the power distribution access network of any of examples 62-67 wherein at least one of the remote distribution nodes includes a first part and an optional second part, wherein the optical lines drop off at the first part and are indexed at the first part, and wherein the second part has power management circuitry.

Example 69 includes the power distribution access network of example 68, wherein the second part holds a voltage converter.

Example 70 includes a power sourcing equipment device for a power distributing fiber access network, the device comprising: at least one data port configured to couple to a fiber network; at least one power supply unit configured to couple to a local power supply; a least one hybrid power-data port configured to couple to a hybrid power-data cable; and a power injector and port control bus coupled to a power sourcing equipment controller, wherein the power injector and port control bus directs data traffic between the at least one data port and the a least one hybrid power-data port, and delivers power to the a least one hybrid power-data port; wherein at least one hybrid power-data port comprises a disconnect mechanism, wherein the disconnect mechanism includes a mechanical interlock that secures the hybrid power-data cable to the at least one hybrid power-data port, wherein when the disconnect mechanism is actuated, the power sourcing equipment controller curtails current flow at the at least one hybrid power-data port before the mechanical interlock releases the hybrid power-data cable.

Example 71 includes the device of claim 70, wherein the power sourcing equipment controller is coupled to a power management system.

Example 72 includes the device of claim 71, wherein the power sourcing equipment controller is configured to transmit a polling signal from the at least one hybrid power-data port; wherein the power sourcing equipment controller is configured to receive a response to the polling signal that includes power class information for a remote distribution node coupled to the at least one hybrid power-data port via the hybrid power-data cable and send the power class information to the power management system; and wherein the power management system directs the power sourcing equipment controller to enable delivery of power at the at least one hybrid power-data port based on the power class information.

Example 73 includes a power-up method for managing power distribution to remote delivery nodes of a power distributing fiber access network, the method comprising: transmitting a polling signal from an un-powered first hybrid power-data port of a power sourcing equipment device; when a response to the polling signal is received at the first hybrid power-data port from a remote distribution node, initiate a power-up handshake with the remote distribution node; sending power class information for the remote distribution node received during the power-up handshake to a power management system coupled to the power sourcing equipment device; and if authorized by the power management system based on the power class information, enable power delivery from the first hybrid power-data port to a hybrid power-data cable coupled to the first hybrid power-data port.

Example 74 includes the method of example 73, further comprising: controlling at least one external port of the remote distribution node with the power management system.

Example 75 includes the method of any of examples 73-74, further comprising: controlling at least one internal port within the remote distribution node with the power management system.

Example 76 includes the method of example 75, wherein the at least one internal port of within the remote distribution node controls power flow between a first bus operating at a first voltage level and a second but operating at a second voltage level different than the first voltage level, wherein power is delivered from the first hybrid power-data port to the hybrid power-data cable at the first voltage level.

Example 77 includes the method of any of examples 73-76, further comprising: switching a direction of power flow within the remote distribution node to reverse powering of the remote distribution node from the first hybrid power-data port of the power sourcing equipment device to a second hybrid power-data port of the power sourcing equipment device.

Example 78 includes a network interface device, the network interface device comprising: a housing; a first hybrid power-data connection interface coupled to the housing, the first hybrid power-data connection interface including a fiber interface and a power interface, the fiber interface having a plurality of sequential fiber positions; a second hybrid power-data connection interface coupled to the housing, the second hybrid power-data connection interface including a fiber interface and a power interface, the fiber interface of the second hybrid power-data connection interface having a plurality of sequential fiber positions; a managed gated pass-through power bus coupled between the first hybrid power-data connection interface and the second hybrid power-data connection interface; and a node controller powered from at least one of the first hybrid power-data connection interface or the second hybrid power-data connection interface, wherein power flow though the managed gated pass-through power bus is controlled by the node controller; a local hybrid power-data connection interface coupled to the housing, the local hybrid power-data connection interface including a fiber interface and a power interface, the fiber interface of the local hybrid power-data connection interface having fewer optical fibers than the fiber interface of the first and second hybrid power-data connection interfaces; the power interface of the first hybrid power-data connection interface being electrically connected to the power interface of the second hybrid power-data connection interface via the managed gated pass-through power bus, and to the power interface of the local hybrid power-data connection interface; a plurality of optical fibers having first ends disposed at the sequential fiber positions of the fiber interface of the first hybrid power-data connection interface, the plurality of optical fibers including a first optical fiber extending to the fiber interface of the local hybrid power-data connection interface; and a remainder of the plurality of optical fibers extending to the fiber interface of the second hybrid power-data connection interface, the remainder of the plurality of optical fibers being indexed along the sequential fiber positions between the fiber interface of the first hybrid power-data connection interface and the fiber interface of the second hybrid power-data connection interface.

Example 79 includes the network interface device of any of Examples 1-18, the network interface device further comprising: a housing, wherein the first hybrid power-data port is coupled to the housing, the first hybrid power-data port including a fiber interface and a power interface, the fiber interface having a plurality of sequential fiber positions, wherein the second hybrid power-data port is coupled to the housing, the second hybrid power-data port including a fiber interface and a power interface, the fiber interface of the second hybrid power-data port having a plurality of sequential fiber positions; a local hybrid power-data connection interface coupled to the housing, the local hybrid power-data connection interface including a fiber interface and a power interface, the fiber interface of the local hybrid power-data connection interface having fewer optical fibers than the fiber interface of the first and second hybrid power-data ports; the power interface of the first hybrid power-data port being electrically connected to the power interface of the second hybrid power-data port via the managed gated pass-through power bus, and to the power interface of the local hybrid power-data connection interface; a plurality of optical fibers having first ends disposed at the sequential fiber positions of the fiber interface of the first hybrid power-data port, the plurality of optical fibers including a first optical fiber extending to the fiber interface of the local hybrid power-data connection interface; and a remainder of the plurality of optical fibers extending to the fiber interface of the second hybrid power-data port, the remainder of the plurality of optical fibers being indexed along the sequential fiber positions between the fiber interface of the first hybrid power-data port and the fiber interface of the second hybrid power-data port.

In various alternative embodiments, system and/or device elements, method steps, or example implementations described throughout this disclosure (such as the power management system, power sourcing equipment, intelligent remote distribution nodes, port and node controllers and other device controllers, or sub-parts of any thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A power sourcing and management system for a power distributing fiber access network, the system comprising:
   a power sourcing equipment device comprising:
      at least one data port configured to couple to a telecommunications network;
      at least one power supply unit configured to couple to a local power supply;
      at least one hybrid power-data port configured to be coupled, via a hybrid power-data cable, to at least one remote distribution node comprising at least one internal port configured to control power flow between buses within the at least one remote distribution node;
   a power management system, wherein the power management system is configured (a) to manage power delivered to one or more remote powered devices by controlling the at least one remote distribution node via the at least one hybrid power-data port and (b) to manage power delivery to the one or more remote powered devices by selectively switching enablement of the at least one internal port; and
   wherein the at least one hybrid power-data port is configured to deliver power at a first voltage level to the at least one remote distribution node over at least one pair of electrical conductors of the hybrid power-data cable;
   wherein the at least one remote distribution node is configured to deliver power, at a second voltage level different than the first voltage level, to one or more remote powered devices.

2. The system of claim 1, wherein the power management system enables delivery of power at the first voltage level to the at least one remote distribution node based on power class information received from the at least one remote distribution node by the power sourcing equipment device.

3. The system of claim 1, wherein the at least one remote distribution node is indirectly coupled to the at least one hybrid power-data port via at least one intervening remote distribution node.

4. The system of claim 1, wherein the power sourcing equipment device further comprises:
   a power sourcing equipment controller; and
   a power injector and port control bus coupled to the power sourcing equipment controller;
   wherein the power injector and port control bus directs data traffic between the at least one data port and the at least one hybrid power-data port, and delivers power to the at least one hybrid power-data port.

5. The system of claim 4, wherein the power sourcing equipment controller is configured to transmit a polling signal from the at least one hybrid power-data port;
   wherein the power sourcing equipment controller is configured to receive a response to the polling signal that includes power class information for a remote distribution node coupled to the at least one hybrid power-data port via the hybrid power-data cable and send the power class information to the power management system; and
   wherein the power management system directs the power sourcing equipment controller to enable delivery of power at the at least one hybrid power-data port based on the power class information.

6. The system of claim 1, wherein the power management system is configured to detect one or more electrical fault conditions and control at least one local port of the at least one remote distribution node in response to the detected one or more electrical fault conditions.

7. The system of claim 6, wherein the power management system is configured to de-energize an overloaded port, or an upstream port feeding the overloaded port, in response to the detected one or more electrical fault conditions.

8. The system of claim 6, wherein in response to an overload fault condition on the at least one hybrid power-data port, the power management system sheds loads fed from the at least one hybrid power-data port based on a priority order.

9. The system of claim 6, wherein in response to an overload fault condition at a local port of the at least one remote distribution node, power to the local port is disconnect while still permitting pass-through of power between hybrid power-data ports of the at least one remote distribution node.

10. The system of claim 1, wherein excess power delivered from the at least one hybrid power-data port charges a local energy storage device at the at least one remote distribution node.

11. The system of claim 10, wherein power from the local energy storage device is utilized to offset power draw from the power sourcing equipment device to average out a power demand for the at least one remote distribution node.

12. The system of claim 10, wherein power from the local energy storage device selectively supplements power supplied by the power sourcing equipment device in response to an increase in the power drawn from a first remote powered device of the one or more remote powered devices.

13. The system of claim 10, wherein remote powered device loads connected to the power sourcing equipment device are assigned a priority ranking;
wherein the power management system manages maintaining and shedding of the remote powered device loads based on the priority ranking.

14. The system of claim 1, wherein the at least one remote distribution node comprises a plurality of local ports each configured to power at least one of the one or more remote powered devices;
wherein the power management system manages power delivery to the one or more remote powered devices by selectively switching enablement of the plurality of local ports at the at least one remote distribution node.

15. The system of claim 1 wherein the power sourcing equipment device comprises a power sourcing equipment controller;
wherein the power sourcing equipment controller communicates with the power management system to operate a power injector and port control bus to enable and disable individual hybrid power-data ports of the at least one hybrid power-data port.

16. The system of claim 1, wherein the at least one remote distribution node comprises a DC-to-DC converter that electrically couples a pass-through power bus to a local power bus;

wherein the power management system is configured to switch the DC-to-DC converter between a buck operating mode and a boost operating mode; and
wherein in the buck operating mode the DC-to-DC converter enables a power flow and a voltage step-down from the pass-through power bus to the local power bus;
wherein in the boost operating mode the DC-to-DC converter enables a power flow and a voltage step-up from the local power bus to the pass-through power bus.

17. A method for power sourcing and management for a power distributing fiber access network, the method comprising:
delivering, over at least one pair of electrical conductors of a hybrid Dower-data cable, power from a power sourcing equipment device at a first voltage level to at least one remote distribution node comprising at least one internal port configured to control power flow between buses within the at least one remote distribution node, wherein the a remote distribution node is coupled to a hybrid power-data port of the power sourcing equipment device by the hybrid power-data cable;
delivering power from the remote distribution node to one or more remote powered devices at a second voltage level different than the first voltage level; and
controlling the remote distribution node with a power management system to manage power delivered to the one or more remote powered devices by the remote distribution node and to manage power delivery to the one or more remote powered devices by selectively switching enablement of the at least one internal port.

18. The method of claim 17, further comprising:
detecting one or more electrical fault conditions; and
controlling with the power management system at least one local port of the at least one remote distribution node in response to the detected one or more electrical fault conditions.

19. The method of claim 17, wherein excess power delivered from the at least one hybrid power-data port charges a local energy storage device at the at least one remote distribution node, the method further comprising:
selectively supplementing power supplied by the power sourcing equipment device with power from the local energy storage device in response to an increase in the power drawn from a first remote powered device of the one or more remote powered devices.

* * * * *

UNITED STATES PATENT AND TRADEMARK OFFICE
CERTIFICATE OF CORRECTION

PATENT NO. : 11,695,593 B2
APPLICATION NO. : 17/102589
DATED : July 4, 2023
INVENTOR(S) : Mather et al.

It is certified that error appears in the above-identified patent and that said Letters Patent is hereby corrected as shown below:

In the Claims

At Column 42, Line 16, please replace "a hybrid Dower-data cable," with --a hybrid power-data cable,--.

Signed and Sealed this
Twelfth Day of March, 2024

Katherine Kelly Vidal
*Director of the United States Patent and Trademark Office*